US008876956B2

(12) United States Patent
Ball et al.

(10) Patent No.: US 8,876,956 B2
(45) Date of Patent: Nov. 4, 2014

(54) SYSTEM FOR WATER RECOVERY INCLUDING MULTIPLE POWER SOURCES

(71) Applicant: Z124, Geoge Town (KY)

(72) Inventors: James Ball, Hamilton (CA); Charles Becze, Oakville (CA); Michael J. Flynn, Burlington (CA); Kean Wing Kin Lam, Richmond Hill (CA); Richard Teltz, Hamilton (CA)

(73) Assignee: Z124, George Town (KY)

( * ) Notice: Subject to any disclaimer, the term of this patent is extended or adjusted under 35 U.S.C. 154(b) by 141 days.

(21) Appl. No.: 13/660,639

(22) Filed: Oct. 25, 2012

(65) Prior Publication Data

US 2013/0319032 A1    Dec. 5, 2013

Related U.S. Application Data

(60) Provisional application No. 61/655,316, filed on Jun. 4, 2012.

(51) Int. Cl.

| | |
|---|---|
| *B01D 53/02* | (2006.01) |
| *B01D 53/26* | (2006.01) |
| *F25B 17/02* | (2006.01) |
| *B01D 53/28* | (2006.01) |
| *B01D 53/04* | (2006.01) |
| *F24F 3/14* | (2006.01) |
| *F25B 43/00* | (2006.01) |
| *F25D 21/14* | (2006.01) |
| *B01D 53/18* | (2006.01) |

(52) U.S. Cl.
CPC .............. *B01D 53/263* (2013.01); *F25B 17/02* (2013.01); *B01D 53/28* (2013.01); *Y02B 60/50* (2013.01); *B01D 53/0454* (2013.01); *F24F 3/1417* (2013.01); *F25B 43/00* (2013.01); *B01D 53/26* (2013.01); *Y02B 30/62* (2013.01); *F25D 21/14* (2013.01); *B01D 53/18* (2013.01)
USPC .................... 96/112; 96/140; 96/141; 95/117; 95/118; 95/199; 95/223; 95/231

(58) Field of Classification Search
USPC .............. 95/117, 118, 199, 223, 231; 96/112, 96/140, 141
See application file for complete search history.

(56) References Cited

U.S. PATENT DOCUMENTS 1,772,089 A * 8/1930 Smith .............................. 96/120
2,026,935 A * 1/1936 Downs .............................. 95/91
(Continued)

OTHER PUBLICATIONS

U.S. Appl. No. 13/660,499, filed Oct. 25, 2012, Ball et al.

(Continued)

*Primary Examiner* — Christopher P Jones
(74) *Attorney, Agent, or Firm* — Sheridan Ross P.C.

(57) ABSTRACT

A system and method recover water from an ambient airstream. Dehumidification of the airstream is also achieved by removal of the water. A device of the system includes a chamber having a group of trays that hold respective amounts of liquid desiccant in each tray. A foam media absorbs the desiccant to increase an exposed surface of the desiccant to the airstream. Fans and valves are used to control airflow through the device. A charge cycle circulates air through the device to remove water vapor from the airstream. A subsequent extraction cycle removes water collected in the liquid desiccant by a condenser communicating with the chamber. An integral heat exchanger, powered by a variety of power sources, adds heat to the chamber during the extraction cycle. A controller is used to integrate and manage all system functions and input variables to achieve a high efficiency of operational energy use for water collection.

20 Claims, 14 Drawing Sheets

(56) References Cited

U.S. PATENT DOCUMENTS

| | | | |
|---|---|---|---|
| 2,804,935 A * | 9/1957 | Hutchinson | 96/120 |
| 2,804,941 A * | 9/1957 | Hutchinson | 95/199 |
| 2,995,203 A * | 8/1961 | Maurer | 95/22 |
| 3,254,473 A * | 6/1966 | Fryar et al. | 95/180 |
| 3,254,497 A * | 6/1966 | Henry et al. | 62/633 |
| 3,257,738 A * | 6/1966 | Margittai | 34/473 |
| 3,288,448 A * | 11/1966 | Patterson et al. | 96/184 |
| 4,209,364 A | 6/1980 | Rothschild | |
| 4,330,627 A | 5/1982 | Thomas et al. | |
| 4,612,447 A | 9/1986 | Rowe | |
| 4,722,018 A | 1/1988 | Pohl | |
| 4,842,045 A | 6/1989 | Reinmuller | |
| 5,988,283 A * | 11/1999 | Gann | 166/357 |
| 6,059,934 A | 5/2000 | Stober et al. | |
| 6,134,903 A * | 10/2000 | Potnis et al. | 62/271 |
| 6,156,102 A | 12/2000 | Conrad et al. | |
| 6,216,489 B1 | 4/2001 | Potnis et al. | |
| 6,463,891 B2 | 10/2002 | Algrain et al. | |
| 6,536,215 B1 | 3/2003 | Vikstrom | |
| 6,641,947 B1 | 11/2003 | Molloy et al. | |
| 6,717,284 B2 | 4/2004 | Lin | |
| 6,729,133 B1 | 5/2004 | Sorter et al. | |
| 6,800,965 B1 | 10/2004 | Turner et al. | |
| 6,823,151 B2 | 11/2004 | Carlson et al. | |
| 6,898,943 B2 | 5/2005 | Tanaka | |
| 6,899,749 B2 | 5/2005 | Johansson | |
| 6,938,683 B2 | 9/2005 | Lin | |
| 6,981,915 B2 | 1/2006 | Moore et al. | |
| 7,157,802 B2 | 1/2007 | Bodkin | |
| 7,228,887 B2 | 6/2007 | Chen et al. | |
| 7,377,958 B2 * | 5/2008 | Cunanan | 95/92 |
| 7,569,194 B2 | 8/2009 | Russell | |
| 7,780,762 B2 * | 8/2010 | Blondel et al. | 95/90 |
| 7,863,839 B2 | 1/2011 | Schuricht et al. | |
| 7,969,029 B2 | 6/2011 | Vitagliano | |
| 8,021,542 B2 * | 9/2011 | Kirts | 210/96.2 |
| 2001/0015077 A1 * | 8/2001 | Potnis et al. | 62/497 |
| 2006/0206996 A1 | 9/2006 | Lumbert | |
| 2006/0257258 A1 | 11/2006 | Zwebner | |
| 2007/0280400 A1 | 12/2007 | Keller | |
| 2009/0175726 A1 | 7/2009 | Rosati et al. | |
| 2010/0083530 A1 * | 4/2010 | Weisselberg et al. | 34/505 |
| 2011/0138832 A1 * | 6/2011 | Al-Hadhrami et al. | 62/235.1 |
| 2011/0220729 A1 | 9/2011 | Bucknell | |
| 2011/0232485 A1 | 9/2011 | Ellsworth | |
| 2011/0283118 A1 | 11/2011 | Maniktala | |
| 2012/0176078 A1 | 7/2012 | English et al. | |
| 2012/0176978 A1 | 7/2012 | Kim | |
| 2012/0199211 A1 | 8/2012 | Schroder et al. | |

OTHER PUBLICATIONS

U.S. Appl. No. 13/713,972, filed Dec. 13, 2012, Becze et al.
U.S. Appl. No. 13/660,525, filed Oct. 25, 2012, Ball et al.
U.S. Appl. No. 13/714,006, filed Dec. 13, 2012, Becze et al.
U.S. Appl. No. 13/693,398, filed Dec. 4, 2012, Becze et al.
U.S. Appl. No. 13/660,572, filed Oct. 25, 2012, Ball et al.
U.S. Appl. No. 13/660,602, filed Oct. 25, 2012, Ball et al.
U.S. Appl. No. 13/660,620, filed Oct. 25, 2012, Ball et al.
U.S. Appl. No. 13/693,418, filed Dec. 4, 2012, Becze et al.
U.S. Appl. No. 13/693,451, filed Dec. 4, 2012, Becze et al.
U.S. Appl. No. 13/723,113, filed Dec. 20, 2012, Becze et al.
U.S. Appl. No. 13/746,824, filed Mar. 26, 2013, Ball et al.
Website "Waste Heat Recovery Applications," Cool Energy, 2 pages, Jul. 16, 2012 webarchive, retrieved from (web/archive.org/web/20120716024750/htt; ://www.coolenergyinc.com/wasteheat.html).
Website "Waste heat recovery unit," Wikipedia, modified May 28, 2012, retrieved from (web/archive.org/web/20120815192859/http://en.wikipedia.org/wiki/Waste_heat_rec . . . ).
Bhatia "Desiccant Cooling Technology Resource Guide," Continuing Education and Development, Inc. Jan. 2000, 115 pages.
Callier "Military Aircraft May Produce Electricity from Waste Heat," RenewableEnergyWorld.com, Oct. 15, 2009, 1 page, found at (www.renewableenergyworld.com/rea/news/article/2009/10/the-futu re-of-electricity-may-be-found-in-environmentally-friendly-thermoelectric-cells).
Notice of Allowance for U.S. Appl. No. 13/908,576, mailed Jun. 30, 2014, 8 pages.
Notice of Allowance for U.S. Appl. No. 13/713,972, mailed May 21, 2014, 11 pages.
Corrected Notice of Allowance for U.S. Appl. No. 13/713,972, mailed Aug. 1, 2014, 4 pages.
Official Action for U.S. Appl. No. 13/660,572, mailed Jun. 26, 2014, 8 pages.
Official Action for U.S. Appl. No. 13/660,620, mailed Jul. 16, 2014, 5 pages.
Notice of Allowance for U.S. Appl. No. 13/693,418, mailed May 29, 2014, 10 pages.
Official Action for U.S. Appl. No. 13/693,451 mailed Aug. 19, 2014, 5 pages.

* cited by examiner

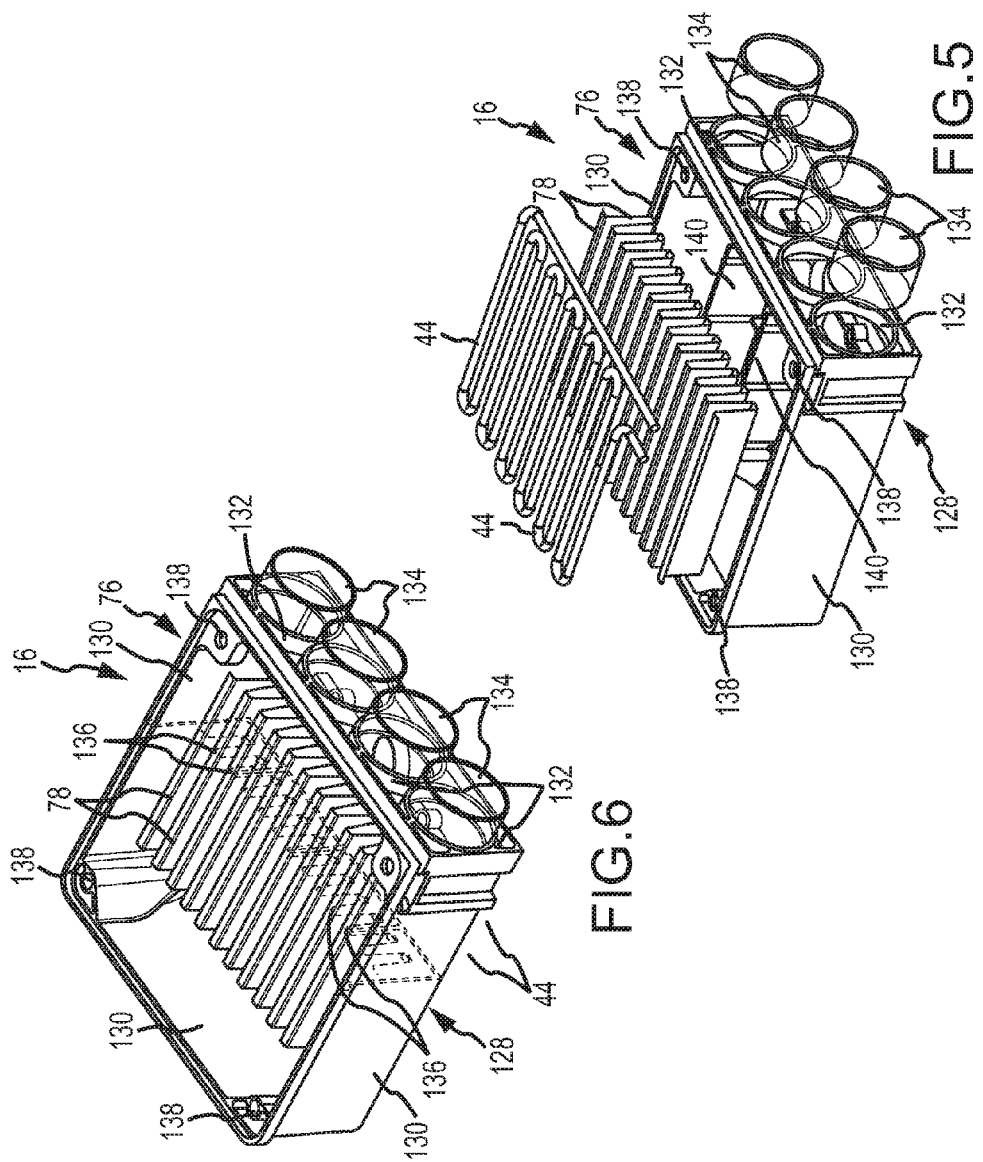

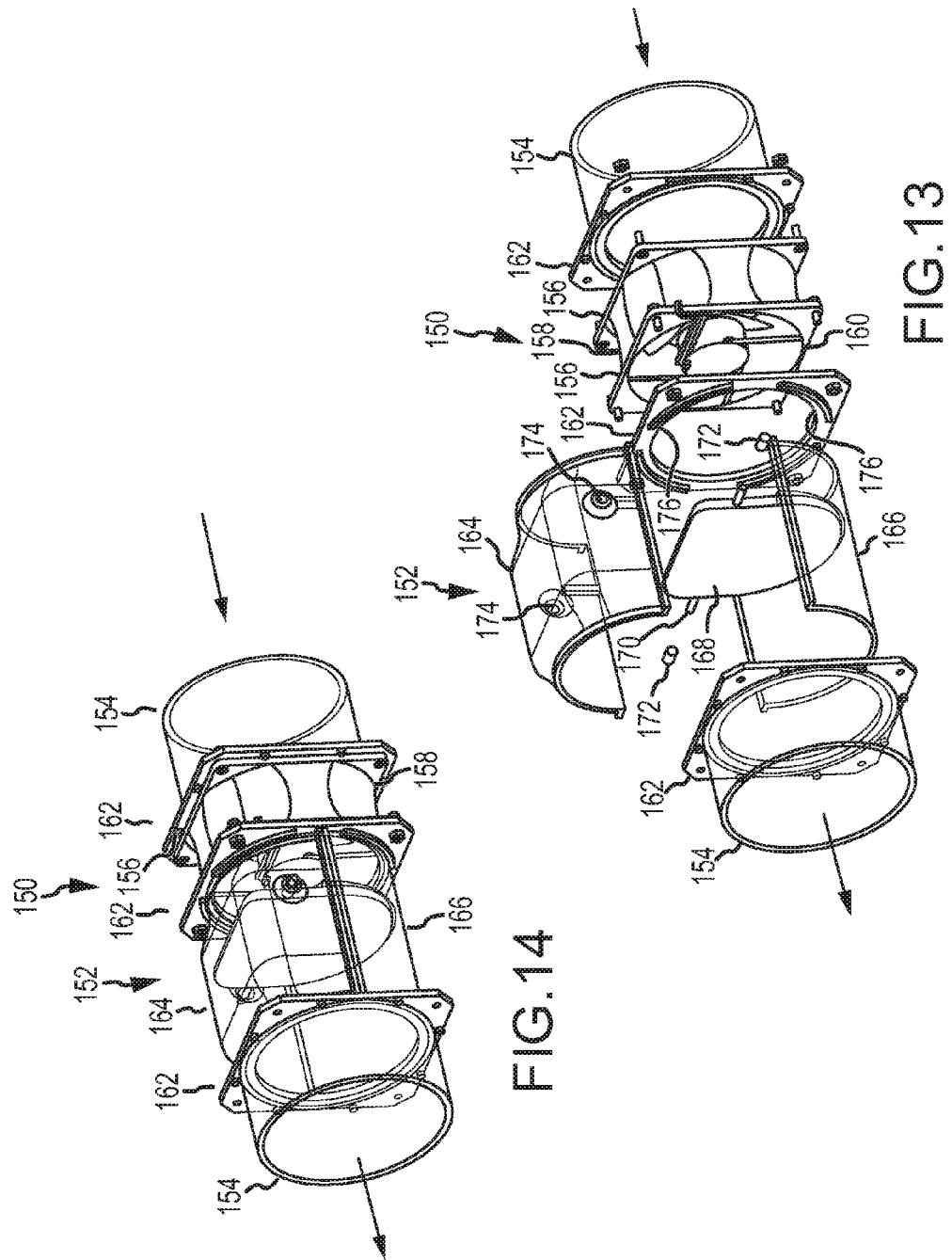

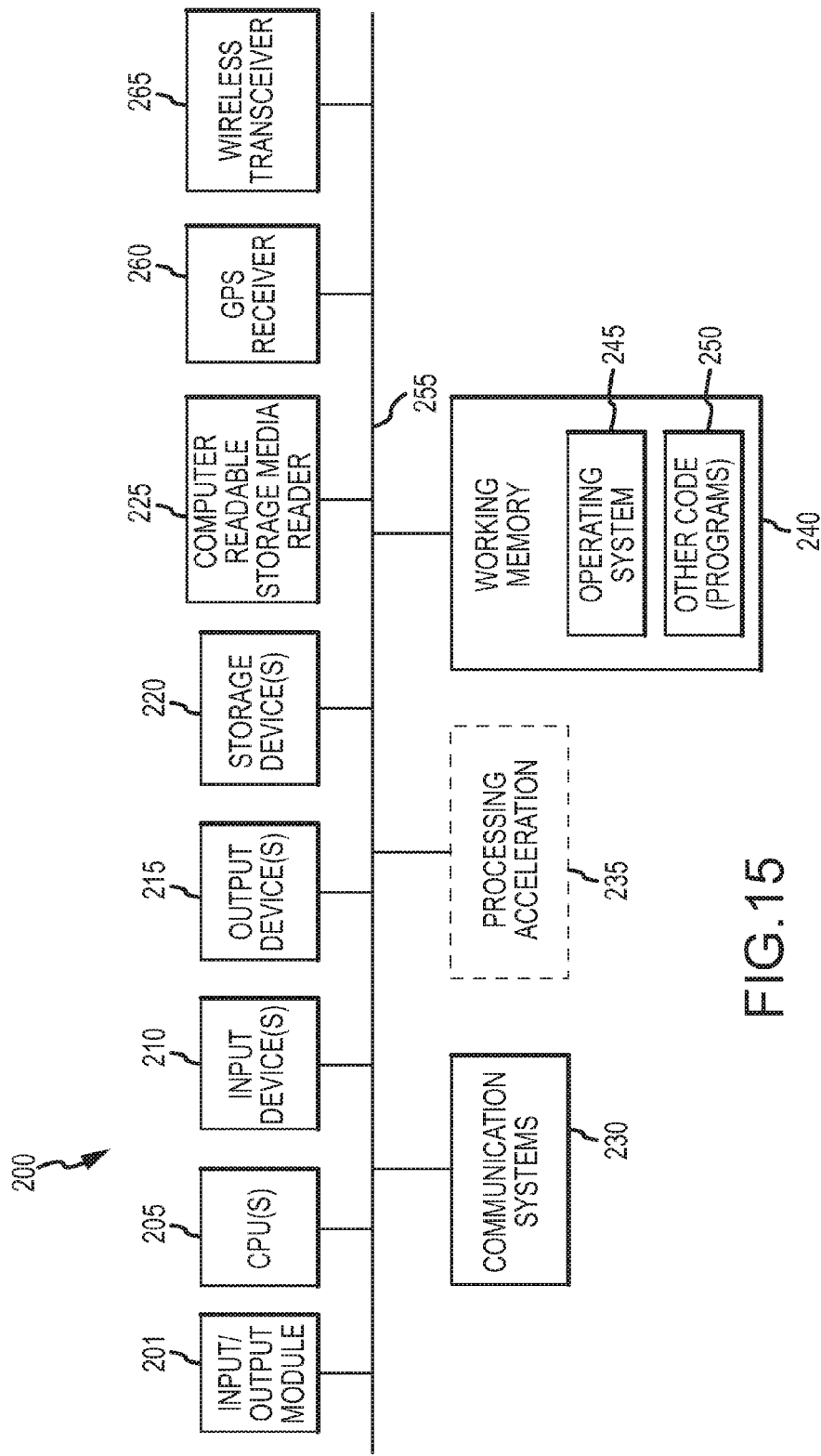

SYSTEM FOR WATER RECOVERY INCLUDING MULTIPLE POWER SOURCES

CROSS REFERENCE TO RELATED APPLICATION

The present application claims the benefits of and priority, under 35 U.S.C. §119(e), to U.S. Provisional Application Ser. No. 61/655,316, filed Jun. 4, 2012, entitled "WATER RECOVERY SYSTEM AND METHOD," herein incorporated by reference in its entirety for all purposes.

FIELD OF THE INVENTION

The invention relates to a water recovery system and method of recovering water from ambient air. More particularly, the invention relates to an apparatus/device and method using a desiccant solution to extract water from the air, and then separating the water from the desiccant, enabled by a variety of power sources. The recovered water may be treated to obtain potable water. A byproduct of the system and method is a stream of dehumidified air that may be used for conditioning an interior airspace within a man-made structure.

BACKGROUND OF THE INVENTION

Potable water is often difficult to obtain in many locations throughout the world. In arid climates, there is simply a shortage of water and if water is available, it may difficult to make the water potable water without extensive water treatment resources. Even in wet climates, potable water may be in short supply because of the lack of treatment equipment. Unfortunate events such as war or general political conflict within a country often results in diminished infrastructure that would normally have the capability to provide potable water.

There are a number of known solutions for obtaining potable water by removing water vapor from the ambient air. One known method includes passing an airstream over a cool surface to condense the water vapor. This technique is well known, for example, in heating, ventilating, and air conditioning units (HVAC). In these types of systems, the condensed water however is usually considered as waste material, and is disposed of.

The use of solid and liquid desiccants is also known for extracting water from air. In a closed loop process, ambient air is passed through a chamber containing a desiccant soaked media. As the air passes in contact with the media, moisture from the air stream is removed by absorption into the desiccant. Heat is then applied to the desiccant media to vaporize the captured moisture. The water vapor is transported away from the chamber, and then condensed and collected. The desiccant is therefore re-concentrated and can be reused in a next water recovery effort.

Water recovery systems include the use of both solid and liquid desiccants. In liquid desiccant systems, one goal is to increase the exposed surface area of the desiccants to the air stream in order to maximize water vapor removal. One method of achieving this is to spray the liquid desiccant in a mist onto the media. However, a misting device adds to the complexity and cost of the system. Systems with solid forms of desiccants may provide a more compact construction. However, solid desiccants have relatively small exposed surface areas thereby limiting the capability to remove water vapor from a passing air stream.

Water recovery systems typically are designed for use with a single type of power source, such as a diesel generator. The power source may be used for one or both of system power needs and heat energy generation, the later required during water vaporization processes. Traditionally, the heat source is a single dedicated source, such as a boiler, that draws power from conventional means. However, traditional heat sources are commonly unavailable in remote locations and, when available, have relatively high operational costs. Also, the traditional reliance on a single type of power source reduces the reliability and robustness of the water recovery system because the failed power source type may not be readily replaced with an alternative power source.

One example of a reference that discloses the use of a liquid desiccant for recovering water from an airstream is the U.S. Patent Application Publication No. 2011/0232485. The reference provides a composite desiccant material formed by a porous polyvinyl alcohol (PVA) foam or non-woven sheets of fiber soaked in a solution of a hygroscopic desiccant such as calcium chloride (CaCl). The desiccant is held in pores of the fiber material ranging in size from 50 microns to 1000 microns. The fiber material is provided in sheets arranged in a stack in a multi-chamber system. During an absorption phase, atmospheric or ambient air flows through the chamber. The water vapor is removed through contact with the desiccant, and is held in the fiber material. In a water recovery phase, energy is added to the chamber in the form of heat in order to release the water from the desiccant by evaporation. Fans circulate air through the chamber, and eventually into a water recovery chamber within a condensing area. Water is recovered in the condensing area, and the dried or water lean airstream leaving the chamber may be used to condition a man-made structure. As also set forth in this reference, a control system can be used to operate fans within the water recovery system when conditions of humidity and the remaining capacity of the desiccant stack are conducive to an efficient charging operation to remove water from the ambient air. The control system may also initiate a regeneration cycle when the availability of low grade heat energy and the degree of saturation of the desiccant are conducive to removing water from the desiccant, that is, when the degree of moisture in the chamber is high enough relative to the temperature of an available cold source for an efficient condensing operation. U.S. Patent Application Publication No. 2011/0232485 is herein incorporated by reference in its entirety for all purposes.

Another example of a patent reference that discloses a method and device for recovering water from ambient air is the U.S. Pat. No. 6,156,102. Specifically, this reference discloses separating water from air by the use of a liquid desiccant to withdraw water from air, treatment of the liquid desiccant to produce water, and regenerating the desiccant for subsequent use. In one preferred embodiment, the method disclosed includes providing a hygroscopic solution comprising a solute in an initial concentration; contacting the hygroscopic solution with ambient air containing water to obtain a water rich hygroscopic solution having a concentration of solute less than the initial concentration and a water lean airstream; separating the water lean airstream from the water rich hygroscopic solution; releasing the water lean airstream to the atmosphere; and treating the water rich hygroscopic solution to obtain water and to return the hygroscopic solution to its original state for re-use. U.S. Pat. No. 6,156,102 is herein incorporated by reference in its entirety for all purposes.

U.S. Pat. No. 4,209,364 discloses a water recovery and removal system that relies on traditional power sources. Specifically, this reference powers its systems through a single heat source, such as a hot process stream or boiler, capable of raising the medium to 120 degree F. or higher. The heat source is integrated into the water recovery and removal system so as to prevent ready adaptation to alternate power sources. U.S. Pat. No. 4,209,364 is herein incorporated by reference in its entirety for all purposes.

As described in the U.S. Pat. No. 6,156,102, the effectiveness of liquid desiccants can be expressed in terms of both their "drying efficiency" and "drying capacity". Drying efficiency is the ratio of total water exposed to the hygroscopic solution as compared to the amount of water removed. The drying capacity is the quantity of water that a unit mass of desiccant can extract from the air. The drying efficiency and drying capacity of a hygroscopic solution is in part dependent upon the pressure of the water vapor in the air and on the concentration of the solute. In general, a hygroscopic solution having a high concentration of solute and thus a low partial pressure of water vapor in the solute, more quickly absorbs water from air having a higher partial pressure of water vapor. Accordingly, the hygroscopic solution has an initial drying efficiency that is relatively high. As water continues to be absorbed during a water recovery process, the partial pressure of the water vapor in the solution increases and the rate of water absorption slows down. Eventually, the hygroscopic solution and the air may reach equilibrium, and no more water will be absorbed by the hygroscopic solution. In a desiccant regenerative process for the hygroscopic solution, the collected water in the hygroscopic solution must be removed. U.S. Pat. No. 6,156,102 is herein incorporated by reference in its entirety for all purposes.

While the prior art may be adequate for its intended purposes, there is still a need for a water recovery system and method that takes advantage of a modular construction in order to provide an integral capability to control parameters for efficient recovery of water from an ambient airstream. There is also a need to provide a construction that is easily adaptable to maximize water recovery for a specific application or situation. There is also a need to provide a water recovery system and method in which pre-established logic can be used to control a water recovery device based upon known environmental factors and taking into consideration the necessary amount of water to be produced. There is yet further a need to provide a device and method that requires a minimum amount of energy for operation, is configured to adapt to and use a variety of power sources, and is conducive to accepting forms of waste heat for operation. There is also a need to provide a water recovery device and method that is reliable, simple to operate, and requires minimum intervention for daily operations. There is also a need to provide a water recovery device and method that is easy to transport, deploy and commission. There is also a need to provide a water recovery device in which monitoring of the concentration of the liquid desiccant solution is achieved automatically, in order to timely and efficiently recover water once the liquid desiccant solution has reached its water saturation limit. During the regenerative phase of a desiccant solution, it is preferable that the concentration of the desiccant does not become too high, which otherwise could result in crystallization or solidification of the liquid desiccant resulting in a reduced efficiency of the device until the desiccant chemical can be placed back into its optimal concentration with water.

SUMMARY OF THE INVENTION

The present invention includes a system and method for recovering water from an ambient airstream. Additionally, the invention achieves dehumidification of the airstream by removal of the water. The device is characterized by a group or stack of trays that hold an amount of liquid desiccant in each tray. A foam media absorbs or wicks the desiccant to increase the exposed surface area between the desiccant and the airstream that is passed through an enclosed chamber that holds the desiccant trays. A number of fans and dampers or valves are used to control the airflow through the chamber.

Operation of the device includes two cycles. The first cycle is a charge cycle in which ambient air is passed through the chamber, across the desiccant stack, and back to the environment. The desiccant causes water vapor in the airstream to be taken up and held in a foam media material that holds the desiccant. In a preferred embodiment, the desiccant is a liquid solution of CaCl and water that is impregnated into the foam media. The foam media may include a thin sheet of PVA that is arranged in an accordion folded manner to increase the surface area of the sheet that is exposed to the airstream. Once the desiccant media has absorbed a sufficient amount of water from the airstream, an extraction cycle is initiated to recover water from the desiccant solution. In this cycle, the chamber is isolated from the ambient air, and energy is added to the chamber in order to vaporize the water from the desiccant solution. In addition to heat energy, the interior pressure of the chamber may be reduced to lower the evaporation temperature required to vaporize the water. For example, a fan can be used to remove an amount of air within the chamber, and then the chamber can be sealed to maintain the lower pressure state. One or more fans circulate the air within the chamber across the desiccant media to increase the rate of evaporation. When the internal temperature of the chamber exceeds a dew point temperature, relative to the external ambient conditions, a condensing circuit is enabled to condense the water vapor from the internal chamber air. The extraction cycle may also be referred to as a regeneration cycle in which the removal of water from the desiccant solution regenerates the desiccant placing it in a condition for re-use in which the concentration of the desiccant is returned to an optimal percentage.

Heat energy may be added to the chamber through a water or glycol-based heat exchanger. There are several possible sources of heat energy that can be used to include solar collectors, photovoltaic cells, electrical heaters, and gas heaters. Power sources to drive heat energy sources include diesel engines, boilers, batteries, geothermal, hydroelectric, human-powered, and power over Ethernet. Furthermore, heat energy may leverage sources of waste heat from available sources to provide power and/or serve as a heat source. Sources of waste heat include co-located industrial plants, powered-vehicles such as automobiles and aircraft with internal combustion engines, and available air conditioning or heating systems.

The condensed water is captured, and may be further treated in order to make potable water. For example, the recovered water may be filtered, exposed to an ultra violet light source, mineralized, chlorinated, or may be otherwise treated to make the water safe for consumption.

A controller is used to integrate and manage all system functions and input variables to achieve a high efficiency of operational energy use for water output. The controller uses sensor inputs to estimate the amount of water in the system, the power used, the power stored, and the relevant external and internal environmental conditions such as temperature, pressure, humidity, sunlight/darkness. During the extraction cycle the controller is used to control heat energy added to the chamber and to also control the condensing rate to therefore sustain continuous operation for recovering water from a previous charge cycle. The controller may take advantage of sensor inputs and software that incorporates a number of algorithms to maximize efficiency of operation. For example, the algorithms may synthesize these inputs to control heat energy added to the chamber in a manner that minimizes energy usage from heat delivery systems and from fans and other internal components. During the charging cycle, similar inputs and algorithms can be used to control power consumption of fans and other internal components and to ensure a maximum water uptake.

For both system cycles, the algorithms may define optimal operating conditions for a known geographical area and a known calendar date which comprises historical data regarding average temperature, humidity, and sunlight/darkness conditions. From these algorithms, a baseline operating sequence can be established, and then modified by actual environmental conditions at the time. The controller receives multiple inputs that measure temperature, humidity, and pressure of the device during operation. Consequently, the controller manipulates outputs to efficiently operate the device by controlling outputs such as fans, dampers, and heat energy added to the device. During an extraction or regeneration cycle, the controller monitors the amount of water removed from the chamber to ensure that too much water is not removed that could result in a high desiccant concentration and crystallization of the desiccant.

In another aspect of control, the invention may include a system in which one or more devices may communicate with remote computing devices within a communications network. These remote computing devices can be used to assist in control of the device(s) and to gather data from the devices or to send updated commands for device operation. Accordingly each controller may further include a wireless transmission and receiving capability. In this regard, a system of the invention may therefore also include multiple devices, each of the devices having a wireless communication capability.

In another aspect of control, the invention may include "location based" capabilities in which Global Positioning System (GPS), magnetometer or other location based subsystems are used to identify location and orientation of the installed system. This information can be used to further exploit data about geographical and/or weather conditions to enable better system efficiencies. For example, knowledge of orientation and duration of sunlight, directions of prevailing winds, etc may be used to obtain better efficiencies for solar energy extraction and minimized fan power needs, respectively.

In another feature of the invention, the device has a modular construction in which the desiccant trays can be arranged in a desired configuration. Further, the modular construction takes advantage of uniform sized tubing and couplers/flanges that allow for easy assembly and disassembly of the device. Further, the fans and dampers may also be of uniform construction, therefore allowing interchangeability among components, for ease of assembly/disassembly.

In yet another feature of the invention, the modular construction allows for a number of different options for adding heat energy to the device. Each of the desiccant trays may be configured to connect to a heating assembly. The heating assembly, in a preferred embodiment, may include a heating coil placed in close proximity to heat distribution fins. The heating assembly itself may be configured as a stackable tray unit.

In yet another feature of the invention, the airflow through the chamber of the device may be dynamically configured to optimize desired water extraction. For example, each of the desiccant trays may include airflow openings on one or more sides of the trays that control the direction of airflow through the chamber. In one example, the airflow may take a torturous path through the chamber in which there is a single or serial path through each of the desiccant trays. In another example, the airflow may take a parallel flow pattern through the chamber in which there may be multiple paths available for airflow through the chamber. Accordingly, airflow through the chamber may be configured to best match fan capabilities in moving an optimum flow of air through the device.

In yet another feature of the invention, the dried airstream that is produced when leaving the device may be used for a number of applications, such as providing a humidity controlled airstream to condition an airspace within a building or other man made structure. Particularly in hot, humid climates, the dried airstream produced can greatly improve working and living conditions within habitable spaces.

Although calcium chloride is disclosed for use as a preferred chemical hygroscopic desiccant, it should be understood that there are a number of other hygroscopic desiccants that could be used. For example, lithium bromide, magnesium chloride, and lithium chloride are known as effective hygroscopic desiccants. However, one advantage of calcium chloride is that it is a non-toxic chemical, and is therefore safe to use.

In one aspect of the invention, it can be considered a system for recovering water from ambient air. In another aspect of the invention, it can be considered an apparatus for recovering water from ambient air with options for manual control, automatic control, or combinations thereof. In another aspect of the invention, it can be considered a system for dehumidifying ambient air for purposes of providing conditioned air for an interior space of a man made structure.

In another aspect of the invention, it may include various sub-combinations of the system and device. These sub-combinations may include (1) the desiccant stack, (2) the heat exchanger with the desiccant stack, (3) the desiccant stack and the condenser, (4) the desiccant stack, heat exchanger, and condenser, and (5) and the desiccant stack, heat exchanger, and condenser further in combination with a controller. Each of these sub-combinations has utility.

Other aspects of the invention include a construction for a desiccant cartridge, a method of selectively controlling air flow through a chamber for a water recovery device, a modular construction for a water recovery device utilizing easily assembled components, a method for controlling a charging cycle of a water recovery apparatus including the use of algorithms to optimize operation, a method for controlling an extraction cycle of a water recovery apparatus including the use of algorithms to optimize operation, a method of operating a water recovery device including the use of algorithms to minimize energy usage, a method of operating a water recovery device including the use of algorithms to provide an even and continuous operation of a water recovery device, and a method of controlling operation of a water recovery device incorporating a plurality of control inputs including various sensors, weigh scales, and flow meters.

Yet further aspects of the invention include a water recovery device utilizing multiple energy sources to power an extraction cycle, a method of determining optimal formulations for a liquid desiccant solution used within a water recovery device, a construction for a desiccant media including a formulation for a liquid desiccant solution, a water recovery device including configurable desiccant media cartridges, a method for selective and dynamic control of a liquid desiccant solution used within a water recovery device, a water recovery device including insulating and sealing components that effectively isolate airflow through the device and otherwise provide optimal temperature and pressure conditions within a chamber of the device, and a method for determining an optimal initial desiccant formulation of a water recovery device considering relevant geographical data corresponding to the geographical location where the device is to be installed.

Taking into consideration the above features and aspects of the invention, the invention can be further described as a water recovery device comprising (i) a desiccant stack including a chamber defining an airflow path therein, the stack including a plurality of desiccant trays, each tray including a desiccant media cartridge and an amount of liquid desiccant placed within the tray and being absorbed by a media material of the media cartridge; (ii) a condenser communicating with the desiccant stack; (iii) a heat exchanger communicating with the desiccant stack; (iv) a heat source in communication with the heat exchanger for providing heat to the heat exchanger; and (v) wherein the water recovery device is operated in a charge cycle for circulating ambient air through the chamber to remove water vapor by the liquid desiccant and retaining water vapor in the chamber, the device being further operated in an extraction cycle to remove the retained water vapor within the chamber, the condenser providing a cooling source to condense the water vapor and thereby producing an amount of water condensate.

The invention can be yet further described as a water recovery system, comprising: (a) a water recovery device including (i) a desiccant stack including a chamber defining an airflow path therein, the stack including a plurality of desiccant trays, each tray including a desiccant media cartridge and an amount of liquid desiccant placed within the tray and being absorbed by a media material of the media cartridge; (ii) a condenser communicating with the desiccant stack; (iii) a heat exchanger communicating with the desiccant stack; (iv) a heat source in communication with the heat exchanger for providing heat to the heat exchanger; (v) wherein the water recovery device is operated in a charge cycle for circulating ambient air through the chamber to remove water vapor by the liquid desiccant and retaining water vapor in the chamber, the device being further operated in an extraction cycle to remove the retained water vapor within the chamber, the condenser providing a cooling source to condense the water vapor and thereby producing an amount of water condensate; (b) a controller incorporated in the device for controlling functioning of the device to include the charge cycle and the extraction cycle, the device further including a plurality of sensors as inputs to the controller, and a plurality of valves and fans as outputs of the controller, the valves and fans being located within air transport lines of the device; (c) said water recovery device further including a communications node incorporated within a communications system enabling the water recovery device to communicate within the communications system.

The preceding is a simplified summary of the disclosure to provide an understanding of some aspects of the invention. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Therefore, other features and advantages of the present disclosure will become apparent from a review of the following detailed description, taken in conjunction with the drawings.

BRIEF DESCRIPTION OF THE DRAWINGS

FIG. 5 is an exploded perspective view of a heat exchanger assembly;

FIG. 6 is a perspective of the assembled heat exchanger assembly of FIG. 5;

FIG. 13 is an exploded perspective of components of the device including a fan and damper/valve combination;

FIG. 14 is an assembled perspective of the components of FIG. 13;

FIG. 15 is a schematic diagram of components of a controller that may be used in conjunction with control of the device;

DETAILED DESCRIPTION OF THE DRAWINGS

Figure 1:
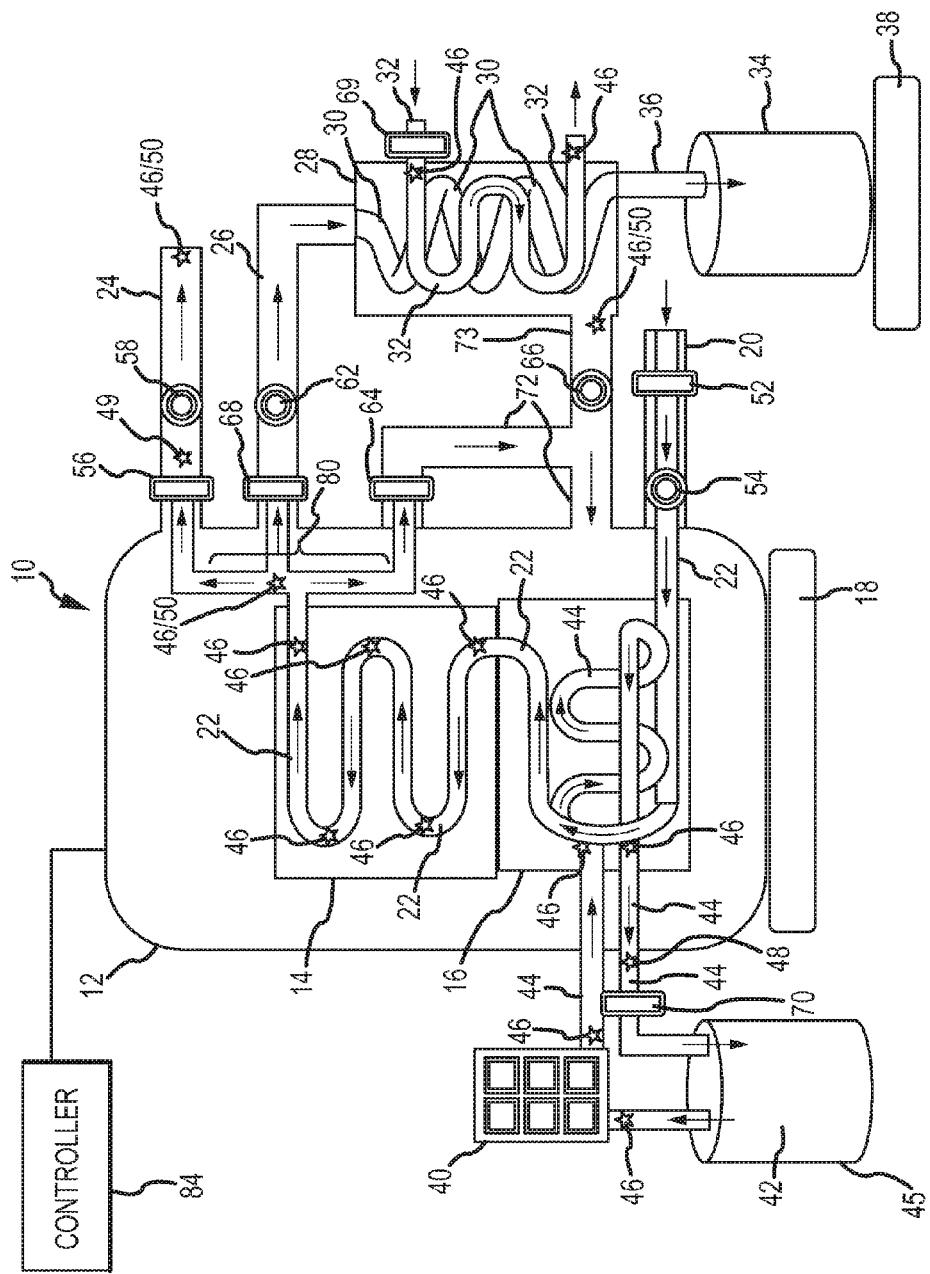
FIG. 1 is a schematic diagram of the device of the invention in one preferred embodiment.

Referring to FIG. 1, a schematic diagram is shown for purposes of illustrating the major functional components of a device of the system. Specifically, the device 10 includes a housing 12 that defines therein an interior space or chamber for receiving a flow of air to remove water vapor from the airstream. The chamber is more specifically defined as including a desiccant stack 14 including a plurality of desiccant trays 74 (see FIG. 2) that each holds a desiccant media material.

Each of the trays 74 have a quantity of a liquid desiccant solution placed in contact with the desiccant media material that wicks or absorbs the solution, as set forth further below with respect to the description of the FIGS. 2-4. The device 10 further includes one or more heat exchanger assemblies 16 for providing heat to the chamber. A weigh scale 18 is used to monitor the mass of water vapor that is collected from the airstream during a charge cycle, as well as the mass of water vapor that is removed from the liquid desiccant solution during an extraction cycle.

An ambient or environmental or ambient air intake line 20 provides an entry point for the ambient air to enter the chamber area. The ambient air entering the chamber follows a flow path 22 through the heat exchanger assembly 16 and the desiccant stack 14. In the schematic diagram of FIG. 1, the flow path 22 illustrates a winding or torturous path, which is explained in more detail below with respect to configurable flow paths shown in the FIGS. 11 and 12. An exhaust line 24 returns the airstream that has traveled through the chamber back to the atmosphere. Alternatively, the exhaust line 24 may communicate with ductwork of a man made structure (not shown) to provide a conditioned airstream for the structure.

The airstream through the chamber may take one of several paths, depending upon the particular cycle in which the device is operating at the time. In the case of a charge cycle, the airstream is exhausted to the atmosphere or manmade structure through the exhaust line 24. During an extraction cycle, air within the chamber exits the chamber through the condenser inlet line 26 that interconnects the chamber with the condenser 28. Also during an extraction cycle, prior to when air within the chamber reaches the desired saturated state ready for condensing, air is re-circulated through the chamber by re-circulating line 72, as also discussed below.

FIG. 1 also schematically illustrates a cooling coil 30 that is used to condense the moist airstream for extraction of water vapor from the airstream. An ambient air cooling line 32 is also illustrated within the condenser 28. During the extraction cycle, ambient air is used as the cooling source for condensing the warmer, moist airstream that has entered the cooling coil 30. A water collection container 34 is provided for collecting the condensed water by water line 36 that interconnects the condenser 28 to the container 34. A weigh scale 38 may also be used to monitor the amount of water extracted. In conjunction with scale 18, the scale 38 provides control inputs for monitoring water recovery.

The heat exchanger assembly 16 includes a heat source 40. The heat source 40 in the schematic of FIG. 1 is shown as a solar collector or photovoltaic cell. A closed loop heating line 44 is used to re-circulate an amount of heating fluid 42. As shown, the heating line 44 traverses through the chamber and in close proximity with the desiccant stack 14. The heating fluid 42 may be a conventional heating fluid such as water or glycol. A heating fluid container 45 is provided to store the heating fluid. A fluid pump 70 is used to re-circulate the heating fluid through the heating line 44. Although FIG. 1 illustrates the heat source 40 and container 45 as separated from the other components of the heat exchanger assembly 16 within the chamber, it shall be understood that the heat exchanger assembly 16 could be housed in a number of different configurations to accommodate the particular application which the device is being used.

A variety of other heat sources may be used, alone or in combination. Such heat sources, and/or power sources configured to drive the heat sources, may directly serve as a heat source or may leverage sources of waste heat. (The phrase "power source" herein means a source of energy that may be used, among other things, to drive a heat source and/or power all or some components or sub-systems of the device 10, to include the heat exchanger assembly 16). For example, the heat source could include waste heat from an industrial process, or waste heat captured from the exhaust manifold or engine of a vehicle. The heat exchanger assembly 16 is adaptable and/or configured to utilize a variety of heat sources and/or power sources alone or in combination, in parallel and/or in series arrangement. Although FIG. 1 depicts an embodiment of the device 10 in which the heat source 40 is in communication with a heating fluid container 45, other embodiments do not require a heating fluid container 45 and instead, for example, supply heat to heat exchanger assembly 16 without requiring a heating fluid container 45, as described in greater detail below. Representative embodiments of heat sources and/or power sources are provided below, but are not meant to limit the invention's embodiments. Other heat sources and/or power sources known to those skilled in the art may also be utilized.

In one embodiment, the heat source 40 may be any one or more of direct sources, to include steam generators, boilers, the afore-mentioned and detailed solar collector or photovoltaic cell, any available hot process stream and geothermal. The phrase "direct heat source" means a heat source produced by a device or system whose primary purpose is to generate heat. The one or more direct sources of heat also utilize the process depicted in FIG. 1. That is, a closed loop heating line 44 is used to re-circulate an amount of heating fluid 42 as stored in a heating fluid container 45. A fluid pump 70 is used to re-circulate the heating fluid through the heating line 44. In embodiments using, for example, solar collectors, a hot process stream and geothermal, the heating fluid 42 is received from the heating fluid container 45 by the particular heat source which heats the heating fluid 42 and then directs or delivers the heated heating fluid 42 via heating line 44 to the heat exchanger 16.

In another embodiment, the heat source instead delivers heat, or otherwise heats up, the heating fluid 42 as contained in the heating fluid container 45. For example, a geothermal heat source could be used to provide heated steam surrounding the heating fluid container 45, thereby heating the heating fluid 42; the heated heating fluid 42 is then delivered via heating line 44 to the heat exchanger 16. Furthermore, in one embodiment, other means are used to impart energy to the heating fluid container 45 to raise the temperature of the heating fluid 42 contained in the heating fluid container 45. For example, a rotating paddle-wheel (not shown) could be inserted into the heating fluid container 45 which, when rotated, would transfer rotational energy into thermal energy so as to raise the temperature of the heating fluid 42. Such rotational energy could be supplied as a result of turbine shaft rotation by a conventional steam turbine, as powered by any known power source. Also, manual rotation could be provided by an exercise apparatus. Additional disclosure regarding generating power through manual means may be found, for example, in U.S. Pat. No. 4,612,447, which is incorporated by reference in its entirety for all purposes. Furthermore, a wind turbine may be used to provide the rotational energy. Additional disclosure regarding the use of wind power to provide rotational energy and/or generate power is found, for example, in U.S. Pat. No. 6,800,965, which is incorporated by reference in its entirety for all purposes. Additional disclosure regarding the use of wind power mounted on a mobile platform to generate power is found, for example, in U.S. Patent Application Publication No. 2006/0257258, which is incorporated by reference in its entirety for all purposes.

In another embodiment, the heat source is provided from, in total or in part, by various sources of waste heat. Sources of waste heat include co-located industrial plants, powered-vehicles such as automobiles and aircraft with internal combustion engines, and available air conditioning or heating systems. Additional disclosure regarding the use and harvesting of waste heat may be found in U.S. Patent Application Publication No. 2011/0220729, which is incorporated by reference in its entirety for purposes of disclosing example waste heat sources. Waste heat may be utilized as a heat source in the device 10 in at least the two manners described above. That is, as depicted in FIG. 1, the waste heat may be used to provide heat that raises the temperature of heating fluid 42 contained in the heating fluid container 45, the heated heating fluid 42 then delivered to the heat exchanger 16 via heating line 44. As discussed above, the heating fluid 42 may be heated either externally to the heating fluid container 45 (as shown in FIG. 1), or internally, in which the waste heat applies heat to the exterior of the heating fluid container 45 to raise the temperature of the heating fluid 42. Alternatively or in combination, the waste heat could be used to directly supply heating fluid 42 via heating line 44 to the heat exchanger 16. For example, hot exhaust gas emitted as waste from a running automobile could be supplied to the heating line 44 running through the heat exchanger. The hot exhaust gas would thus serve as the heating fluid, and could be re-circulated with the waste heat source. In some embodiments, the heating fluid 42 is a gas, for example, air.

In one embodiment, waste heat from an industrial plant, for example, an incinerator, refinery or chemical plant, is used. Additional disclosure regarding the use of waste heat from an industrial plant may be found, for example, in U.S. Pat. No. 7,569,194, which is incorporated by reference in its entirety for all purposes.

In another embodiment, the waste heat emitted from the exhaust pipe of an engine is indirectly utilized as a heat source. Specifically, a concentric tube is fitted around an existing exhaust pipe of an engine, such as the exhaust pipe of a traditional automobile. The tube is clamped around the exhaust pipe and, at a downstream position, a vent provided. The ambient air between the tube and the exhaust pipe is thereby heated by the hot exhaust of the automobile engine. The heated ambient air is then feed into the heat exchanger assembly 16.

In one embodiment, a power source is used to power a heat source. A common power source used to power a heat source is, for example, through the combustion of a hydrocarbon fuel, such as butane, propane, diesel and JP-8 military jet fuel. The power source may comprise an electrical generator, a battery, diesel and other engines, solar power, wind, nuclear, hydroelectric, human-powered and/or manual means, power over Ethernet and hybrids. Some of the afore-mentioned power sources, such as wind and solar power, supply variable power and require power regulators in order to supply a steady power output to drive a heat source. Alternatively, such variable power sources may be configured to charge a battery which in turn can supply a steady continuous power source to drive a heat source. In embodiments of the device comprising a power source that is used to at least partially power a heat source, the heat source may be used to provide a heating fluid 42 to the heat exchanger 16 in any of the afore-mentioned manners, to include directly providing a heated fluid to a heating line 44 (as discussed regarding waste heat above), by heating a heating fluid external to a heating fluid container 45 and by heating a heating fluid 42 as contained in a heating fluid container 45. For example, a power source may be used to rotate a shaft which in turn rotates a paddle-wheel inside of the heating fluid container 45, thereby raising the temperature of the contained heating fluid 45 prior to supply via heating line 44 to the heat exchanger 16.

In one embodiment, a solar array, solar collector and/or photovoltaic cell is used to generate power which in turn is used to power a heat generator. In such an arrangement, the variable nature of the power supplied by the solar array is engaged with a power regulator before powering a heat generator. In another embodiment, the solar array power generator is used to charge a battery. Specifically, the photovoltaic (PV) cells of the solar array absorb energy from electromagnetic waves and convert photon energy into electrical energy for charging the battery. Furthermore, the battery charging circuit may continuously manipulate a rate or amount of charge from PV cells based on varying light conditions to charge a battery. The battery charging circuit includes a power regulator configured to receive a variable DC power source at an input terminal and to charge the battery coupled to an output terminal. The variable DC power source can be provided by one or more PV cells. In one implementation, the variable DC power source comprises at least two PV cells connected in series or in parallel. Additional disclosure regarding battery charging via PV cells may be found, for example, in U.S. Patent Application Publication No. 2012/0176978, which is incorporated by reference in its entirety for the purpose of disclosing an example PV cell source and related powering configurations.

In another embodiment, power is generated from Power over Ethernet (PoE) so as to power a heat generator. PoE provides an efficient way to deliver power over computer networks. Typically, a PoE system uses a network cable such as a Category 5 (CAT5) Ethernet cable to deliver power to a powered device. The network cable usually comprises four pairs of twisted wires. A typical PoE system also includes power sourcing equipment that controls the flow of power to the powered device. One or more network interfaces, such as RJ45 registered jacks, typically connect power sourcing equipment to a network cable. Additional disclosure regarding the use of PoE to generate power may be found, for example, in U.S. Patent Application Publication No. 2011/0283118, which is incorporated by reference in its entirety for the purpose of disclosing PoE power sources and related systems.

In one embodiment, a hydroelectric generator is used to generate power which in turn is used to power a heat generator. Additional disclosure regarding the use of a hydroelectric generator may be found, for example, in U.S. Pat. No. 7,969,029, which is incorporated by reference in its entirety for the purpose of disclosing hydroelectric generator and related systems.

In another embodiment, power is generated from sea waves so as to power a heat generator. Additional disclosure regarding the use of a sea waves to generate power may be found, for example, in U.S. Pat. No. 6,717,284, which is incorporated by reference in its entirety for the purpose of disclosing power by sea waves and related systems.

In another embodiment, power is generated by compressed gas. The compressed gas may be combusted through any of several known means to produce electricity usable by external devices and/or to recharge batteries. Additional disclosure regarding generating power through compressed gas means may be found, for example, in U.S. Pat. No. 7,157,802, which is incorporated by reference in its entirety for the purpose of disclosing power by compressed gas and related systems.

In one embodiment, power is generated through hybrid energy means. That is, any of the afore-mentioned power-generating means, or those known to one skilled in the art, are combined and/or sub-processes of the power-generating means are combined. For example, traditional gas turbines and combined cycle power plants typically employ electrical generators directly coupled to the gas turbine and compressors that pressurize the working fluid. This arrangement causes the rotating equipment to operate at a constant speed. In order to reduce the electrical output of the generator, the firing temperature of the gas turbine must be reduced and/or air flow restricted by dampers. Combined cycle power plants can increase steam production (and ultimately, electrical generation and thus heat generation) by combusting fuel using duct burners located in a heat recovery steam generator unit. Additional disclosure regarding generating power through hybrid means may be found, for example, in U.S. Patent Application Publication No. 20070280400, which is incorporated by reference in its entirety for the purpose of disclosing hybrid power and related systems.

In another embodiment, power and heat is generated through co-generation. Co-generation is the generation of both electricity and heat to provide space heating and/or hot water from the same unit. Co-generation provides both electricity and usable process or utility heat from the formerly wasted energy inherent in the electricity generating process. Additional disclosure regarding co-generation may be found, for example, in U.S. Pat. Nos. 6,729,133 and 6,536,215, each of which are incorporated by reference in their entireties for the purpose of disclosing co-generation and related systems.

A controller 84 may be used to provide automatic control of the operation of the device. The controller 84 may take the form of known industrial controllers that accommodate control inputs and outputs, and a processor with integral software or firmware. With respect to inputs, the device may be monitored by a number of temperature sensing devices 46, such as thermocouples or RTDs. In FIG. 1, there are a number of temperature sensors shown at various locations throughout the device. Within the heat exchanger assembly, a number of temperature sensing devices 46 are also shown to include sensors located within the heat exchanger, and within the heating line at the entrance and exit from the heat source 40. A number of temperature sensors are also illustrated within the desiccant stack 14, as well as within the condenser 28.

In addition to temperature control, the FIG. 1 also illustrates a liquid flow sensor 48 that measures the flow rate of the heating fluid through the heating line 44. An airflow sensor 49 may also be incorporated within the exhaust line 24 to monitor the flow rate of air through the chamber. Further, a number of relative humidity sensors 50 may be incorporated within the device to measure relative humidity of the airstream. As shown in FIG. 1, relative humidity sensors 50 may be co-located with temperature sensors 46 at the exhaust line 24, at the condenser return line 73, and at other selected locations in which it may be desirable to monitor the relative humidity.

With respect to controlling airflow through the device, a number of fans may be used to precisely control airflow. Referring again to the FIG. 1, the fans may include an intake fan 52 communicating with the air intake line 20, an exhaust fan 56 that communicates with the exhaust line 24, a condenser fan 68 that introduces air into the condenser 28 along condenser inlet line 26, a re-circulating fan 64 that re-circulates air through the chamber through re-circulating line 72, and an ambient air cooling fan 69 that introduces ambient air into the condenser 28. Control of air flow through the device is also achieved through a number of dampers or valves. Again referring to the FIG. 1, the group of valves may include an air intake valve 54 mounted in the air intake line 20, an exhaust valve 58 that is mounted in the air exhaust line 24, a condenser inlet valve 62 that is mounted in the condenser inlet line 26, and a re-circulating valve 66 that is mounted in the condenser return line 73.

Figure 2:
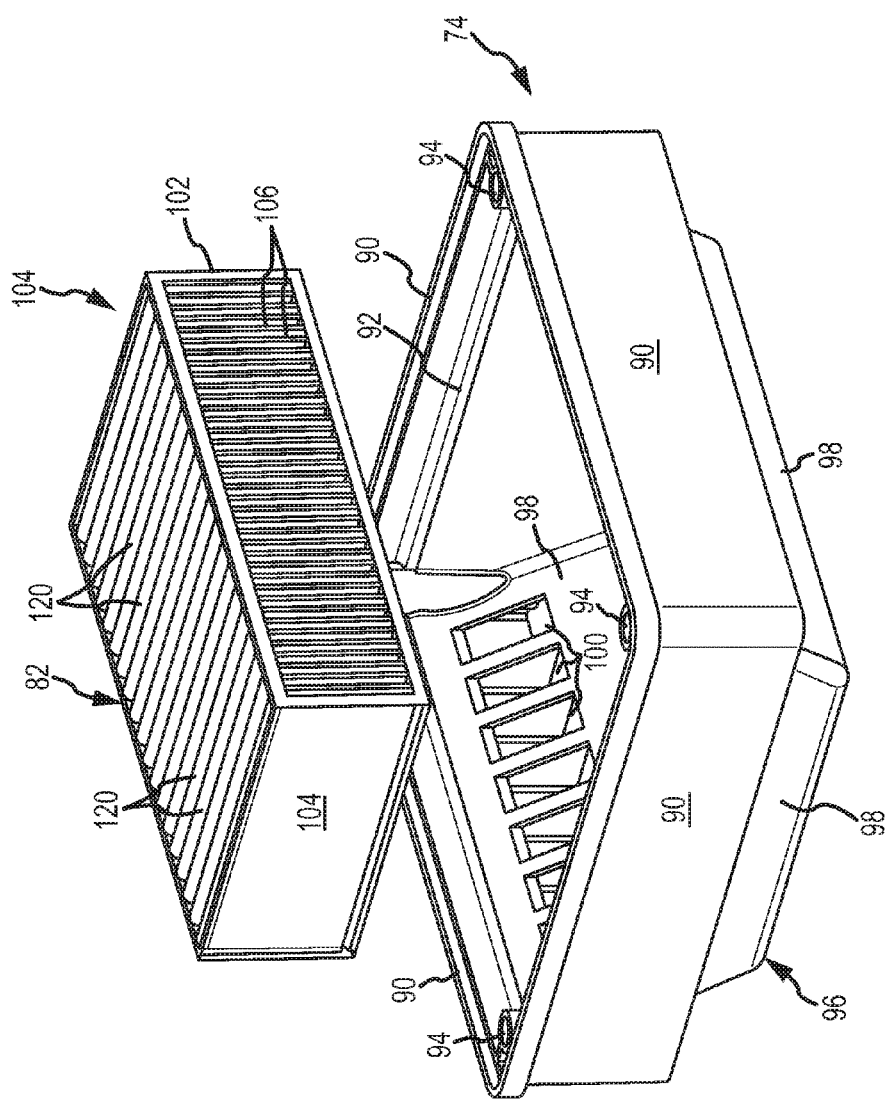
FIG. 2 is an exploded perspective view of a desiccant tray and desiccant media cartridge.
Figure 3:
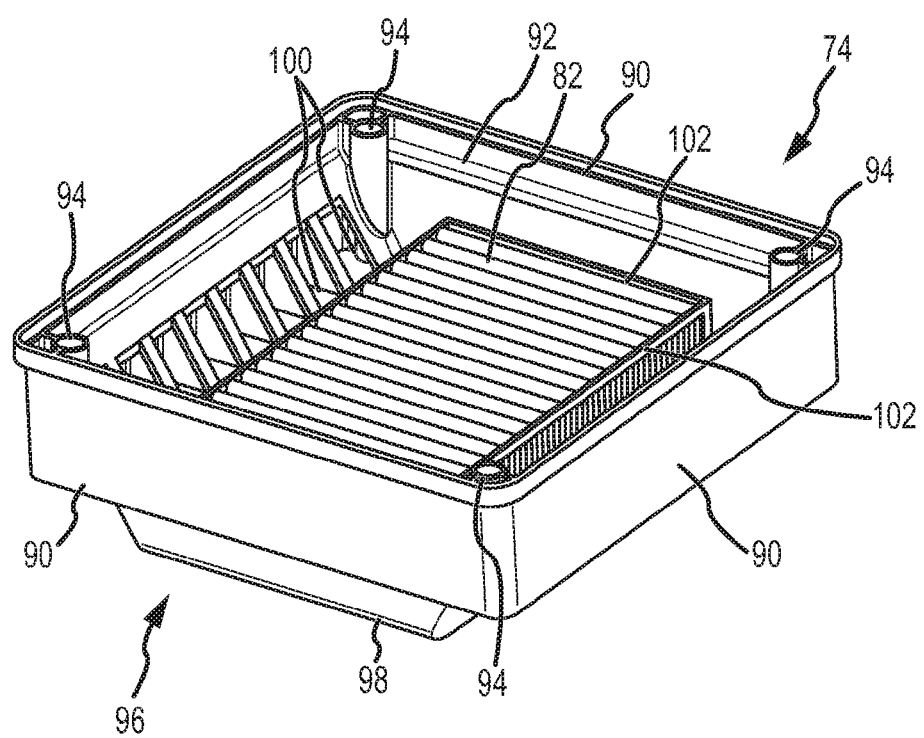
FIG. 3 is another perspective view of the desiccant tray with the desiccant media cartridge mounted within the tray.
Figure 4:
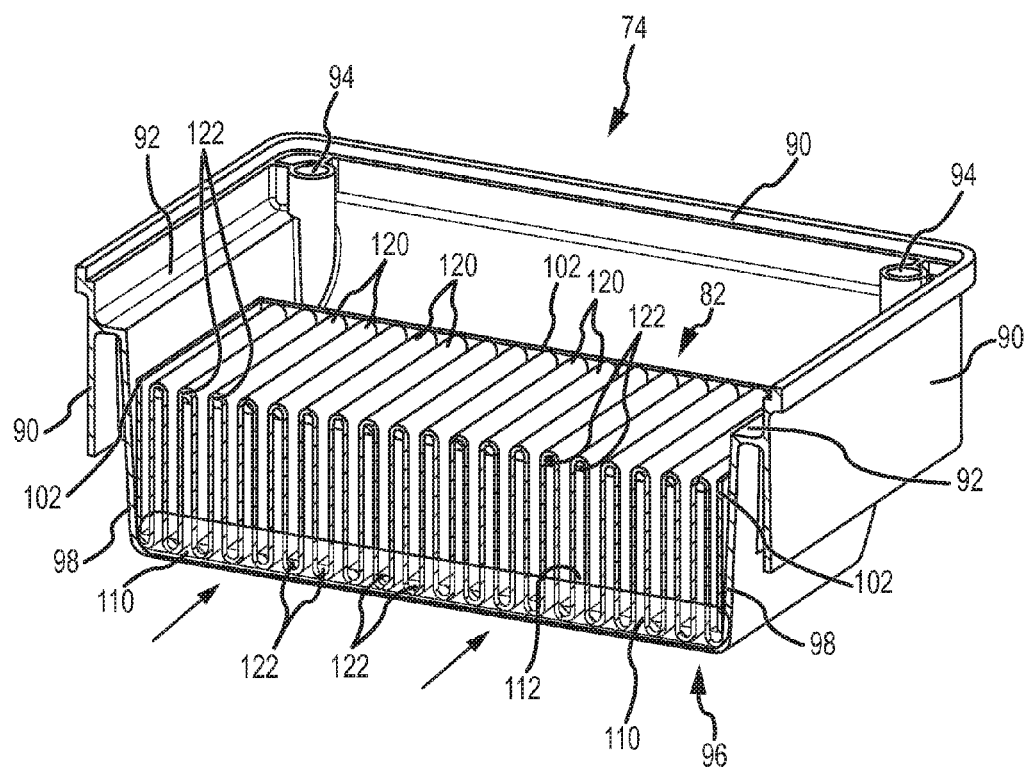
FIG. 4 is a vertical section of the desiccant tray of FIG. 2 showing details of the arrangement of the desiccant media cartridge and an amount of desiccant solution within the tray.

Referring now to FIGS. 2-4, a desiccant tray 74 is illustrated in accordance with a preferred embodiment. The tray 74 includes sidewalls 90, and a base 96. One or more of the sidewalls 90 may include rod receiving channels 94 that receive rods or dowels (not shown) that stabilize the connection between stacked trays 74. At least one pair of opposing sidewalls 90 may include an interior flange 92 for mounting a sealing gasket 75 (see FIG. 8). Preferably, there is a sealing gasket placed between each stacked tray 74 to thereby limit airflow loss through the chamber. The base 96 holds an amount of liquid desiccant solution 110 (FIG. 4). The base 96 includes base sidewalls 98, and one or more of the sidewalls 98 may include a plurality of airflow circulation slots or openings 100. As shown, these openings 100 are disposed at the upper portion of base sidewalls 98, above the liquid line 112 of the liquid desiccant solution 110, and below the top edge of the sidewalls 90. FIGS. 2-4 also illustrate a desiccant media cartridge 82 that is placed within the desiccant tray 74, as best illustrated in the FIG. 3. The media cartridge 82 is shown as a rectangular shaped element that fits within the confines of base sidewalls 98. The media cartridge 82 includes a media frame 102 that holds media material 120 in an accordion folded configuration. The media frame 102 may also include one or more frame panels 104 that can be used to direct airflow through the chamber by preventing air from passing through the panels 104. In the FIG. 2, it is intended to show that the two end walls of the media frame 102 include media frame panels 104, while the opposing sidewalls of the media frame 102 remains open thereby allowing airflow horizontally through the media cartridge 82. In order to stabilize the open sides of the frame 102, the frame may further include screen supports 106 comprising a plurality of wire elements as shown.

Referring to FIG. 4, the media material 120 is illustrated in the form of a thin sheet that is held in the accordion folded configuration to thereby maximize the exposed surface area of the media material to air passing through the chamber. As shown, the desiccant solution 110 fills a portion of the base 96, and the lower end of the media material 120 is submerged in the fluid solution 110. As mentioned, one example of an acceptable media material may include a thin sheet of PVA foam, an absorbent foam that readily wicks the desiccant solution 110. In order to maintain the media material in the accordion folded configuration with uniform gaps or spaces between the folds of material, an internal wire support 122 may be used for stabilizing the media material. When the media material 120 absorbs or wicks the desiccant solution 110, the material serves to evenly distribute the desiccant solution in large surface area within a confined space. Accordingly, the media material 120 and the desiccant solution 110 provide a hygroscopic feature to effectively remove water vapor from a passing airstream. As shown in the FIG. 4, the media material 120 is preferably oriented in a parallel relationship with the flow of air, thereby enabling air to pass through the gaps between the folds of the media material. In this orientation, the airstream maintains significant contact with the exposed surfaces of the media material. As air continues to flow through a media cartridge 82, the amount of water vapor retained in the media material increases. It is possible for the amount of retained water vapor to exceed the liquid holding capacity of the media material, resulting in dripping of the desiccant solution into the pool of desiccant fluid 110. As discussed further below, it is advantageous to begin an extraction cycle prior to complete saturation of the media material.

The thickness of the media material, as well as the configuration of the media material in terms of the size of the gaps between folds of the media material can be adjusted to meet the desired water recovery needs for a particular use. Thinner sheets of material with larger gaps between folds of the material allows for better airflow through the chamber, thereby reducing the airflow pressure drop through the chamber. However, this configuration of the media material limits the amount of water vapor that can be removed from the airflow. Reducing the size of the gaps between the folds of the media material and increasing the width of the media material results in increased capability to remove water from the airflow, but with the disadvantage of increased pressure drop through the chamber therefore requiring greater fan capacity in moving air through the chamber. It is therefore contemplated to adjust the particular configuration of the media material so that water recovery is achieved to meet the needs of the particular use of the device without excessive air pressure drop through the device that may exceed the capacity of the fans.

The desiccant solution 110 is placed in each of the trays 74. This may be done manually at the start of operation of the device. As the device continues to operate, it may be necessary to replenish the desiccant solution. For example, some portions of the desiccant media that absorb the desiccant solution may become dried and crystallized, thereby preventing reactivation of the desiccant chemical without cleaning and re-soaking the desiccant media. In lieu of manually replacing the desiccant solution 110, it is also contemplated that the desiccant solution 110 may be automatically replenished. A desiccant solution reservoir (not shown), and a water reservoir (not shown) may have fluid conveying lines that connect to each or selected ones of the trays 74. Each of the trays may also include a liquid level sensor (not shown) and/or a desiccant concentration sensor (not shown) to sense the concentration of the chemical desiccant. Chemical concentration sensors are devices that measure the electrical potential of a solution, and changes in the electrical potential correspond to known changes in the concentration of a chemical within the solution. Based on inputs from these sensors, replenishment valves (not shown) mounted in the fluid conveying lines could be selectively opened to release a designated amount of water and/or desiccant solution in order to replenish the desiccant solution in the trays. In many cases, it may only be necessary to add water back to the desiccant solution in order to place it at the optimum desiccant concentration.

Referring now to FIGS. 5 and 6, components are illustrated for the heat exchanger assembly 16 that reside below a desiccant stack 14. As shown, the assembly includes a housing 76, including sidewalls 130 and a bottom wall or base 128. One side of the housing 76 includes a tubing manifold 132 with openings to receive corresponding tubing sections 134. Extending upward from the base 128 is a plurality of baffles 140 that are used to support the heating distribution element 78. As shown, the heating distributional element 78 is also an accordion folded element that fits between the sidewalls 130, and is disposed above the heating line 44. The heating line 44 is configured in a winding path to thereby more evenly transfer heat to the heat distribution element 78. The heating line 44 passes through one of the sidewalls 130 as shown in FIG. 6, and communicates with the heat source 40 and container 45 (FIG. 1). Optionally, a wire support element 136 maybe disposed within the housing 76 in order to maintain the heating element 78 in its accordion folded configuration. The heat distribution element 78 may be made from aluminum or another type of corrosive resistant conductor. The housing 76 may also include rod receiving channels 138 that align with channels 98 of the desiccant trays 74 to receive stabilizing rods (not shown) that help to hold the desiccant stack and heat exchanger assembly in a stabilized vertical orientation.

Figure 7:
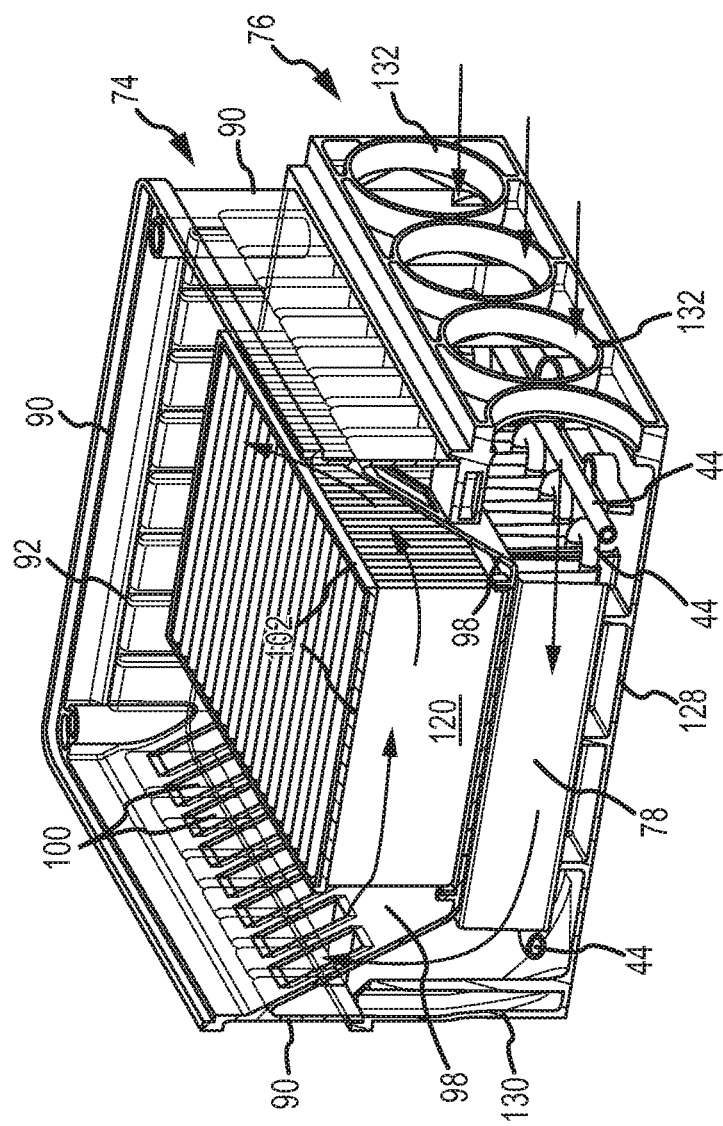
FIG. 7 is a vertical section of a desiccant tray mounted over a heat exchanger assembly, illustrating the relationship between heat distribution elements of the heat exchanger and the desiccant tray.

Referring to FIG. 7, the arrangement of a desiccant tray 74 is shown with respect to the heat exchanger housing 76. As shown, the base or bottom portion of the desiccant tray 74 is located in close proximity to the upper surfaces the heat distribution element 78. This orientation may allow for most efficient heat transfer to the overlying tray 74. FIG. 7 also illustrates the available space for air entering the device in which the air first passes through the gaps between adjacent sections of the heat distribution element 78. The airstream is then directed upwards, through the openings 100 in the base sidewall 98 of the tray. Next, air is forced horizontally through the gaps in the media material 120 and substantially parallel with the orientation of the media material 120. The air then travels upward into the next desiccant tray 74. The path of airflow through this next desiccant tray is dictated by the orientation of the openings 100 in the base sidewalls 98 of the tray.

Figure 8:
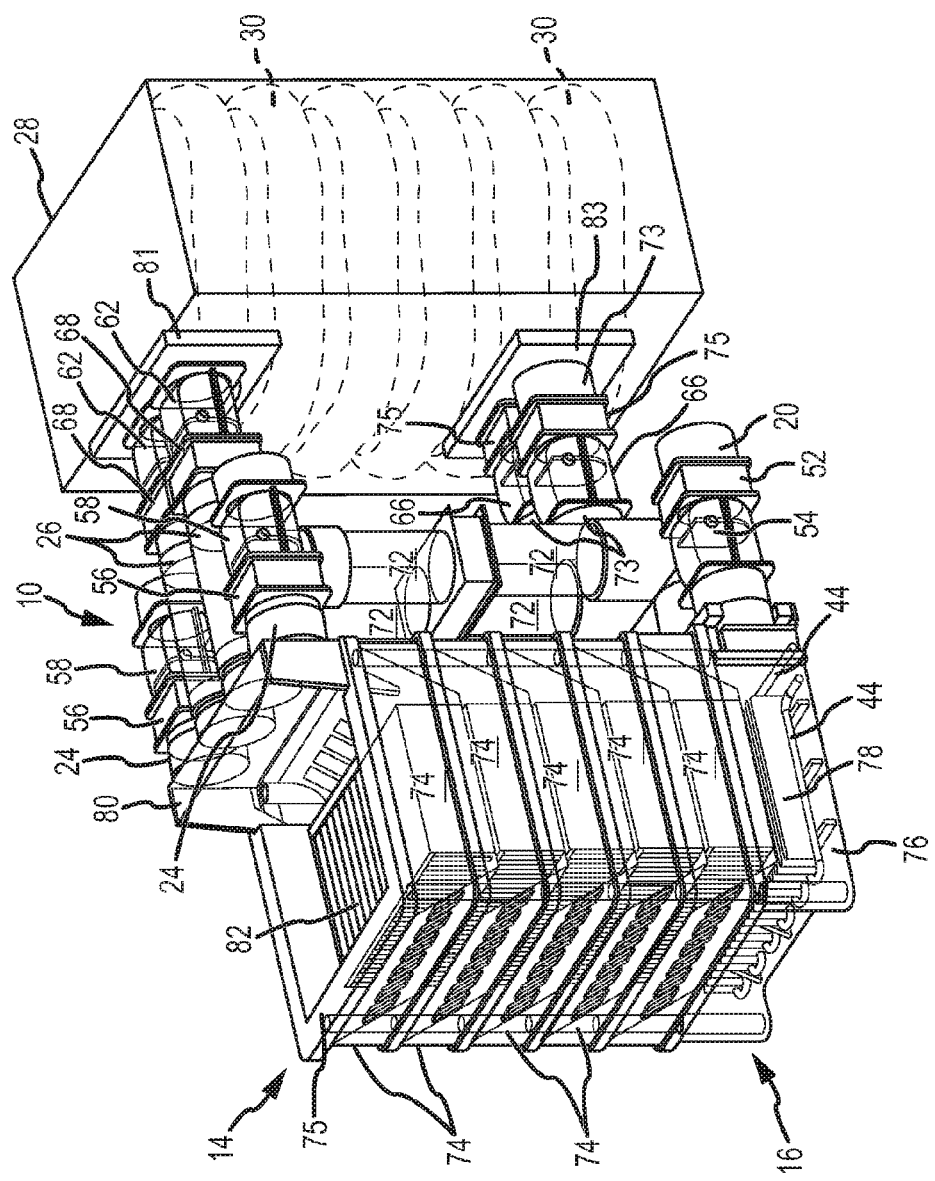
FIG. 8 is a fragmentary perspective of the device in a preferred embodiment.

Referring to FIG. 8, a preferred embodiment is illustrated for the device 10. More specifically, a preferred embodiment is illustrated with respect to construction details for the desiccant stack 14, heat exchanger 16, and the group air conveying elements including fans, valves, conveying lines, and connectors. More specifically, the FIG. 8 illustrates a desiccant stack 14 arranged in a plurality of desiccant trays 74 stacked vertically upon one another over a single heat exchanger assembly 16. The most upper tray 74 is removed for illustration purposes to shown a sealing gasket 75 that is placed between stacked trays. The stack exhaust manifold 80 is also shown in which airflow from the chamber is returned to the atmosphere through lines 24. As shown in this embodiment, instead of a single exhaust line 24, there is a pair of exhaust lines 24 arranged as the outside pair of conveying lines in the group of four adjacent lines. The embodiment of FIG. 8 is intended to illustrate that some of the conveying elements may be provided in duplicate for better airflow control of the device. Accordingly, in addition to duplication of the exhaust lines 24 and associated fans and valves, the FIG. 8 also illustrates duplication of the condenser inlet line 26, re-circulating line 72, return line 73, and the associated valves and fans for these lines. Because of the angle of view in FIG. 8, another inlet line 20 and associated conveying elements cannot be seen, but the FIG. 8 is intended also to represent that there can also be duplication of these elements. In FIG. 8, the condenser 28 is shown in a schematic form only, and it shall be understood that the distal free ends of the lines 26 interconnect with the inlet of the coil 30. Additionally, the FIG. 8 does not illustrate the other components of the condenser as shown in the FIG. 1, but it shall also be understood that the condenser includes these other elements.

In terms of the modular construction of the device, it is clear that the desiccant trays 74 may be conveniently stacked on top of one another in a space saving arrangement. Additionally, the location of the various fans and valves may be conveniently located adjacent the desiccant stack to maintain a relatively small device profile. The lines for conveying airflow may be a plurality of uniform tubing sections, and the tubing sections may connect to one another by a friction fit. Therefore, it is unnecessary to provide sealing gaskets between each and every tubing section. As discussed in more detail below with respect to the FIGS. 13 and 14, the modular construction of the invention further allows for friction fit attachments between the sections of tubing and the various valves and fans.

Figure 9:
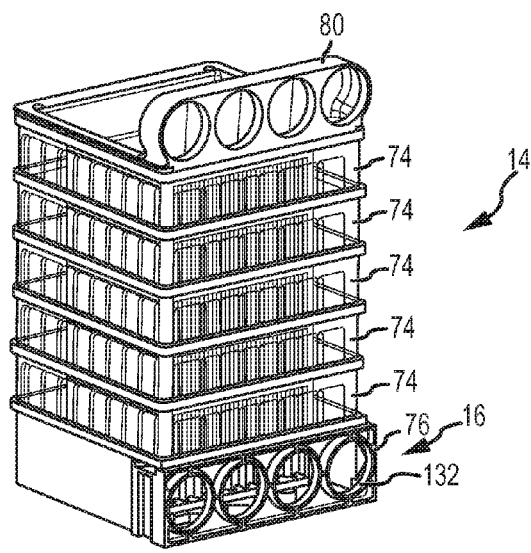
FIG. 9 is a perspective view of a preferred embodiment of a desiccant stack including a plurality of vertically stacked desiccant trays, a heat exchanger assembly located beneath the desiccant trays, and a stack exhaust manifold for directing exhaust air from the desiccant stack.
Figure 10:
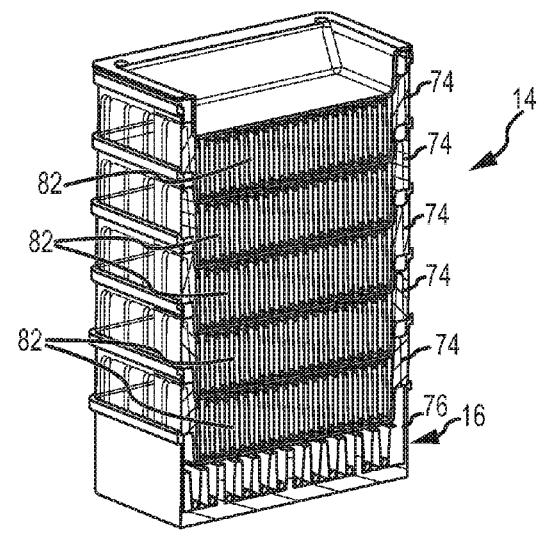
FIG. 10 is a vertical section of FIG. 9 illustrating the relationship between the desiccant trays and the heat exchanger assembly.

Referring to FIG. 9, a desiccant stack 14 is illustrated in the same arrangement as shown in the FIG. 8, but with the various tubing sections, valves, and fans removed. Referring to the FIG. 10, this vertical cross-sectional clearly illustrates the compact and orderly arrangement of the desiccant trays when placed in a vertical configuration. Although the FIGS. 9 and 10 illustrate a vertical desiccant stack arrangement; it is also contemplated that a desiccant stack could include combinations of both vertically and horizontally extending desiccant trays. Accordingly, with respect to a horizontally extending group of desiccant trays, each of the desiccant trays could also include a tubing manifold 132 in lieu of solid sidewalls 90 and 98 enabling horizontally adjacent trays 74 to communicate with one another by tubing sections interconnecting the trays by their corresponding manifolds 132. Therefore, one can appreciate the highly configurable nature of the device in terms of adjusting its shape and size for a particular use. For uses of the device with greater water recovery requirements, a larger number of trays can be used to increase water recovery, or uses of the device with lesser water recovery requirements may dictate a fewer number of trays be used. The requisite number of air conveying lines, fans, and valves can be added to a desiccant stack to ensure proper airflow through the device for purposes of both maintaining airflow through the device during a charging cycle, as well as airflow through the device during an extraction cycle.

Figure 11:
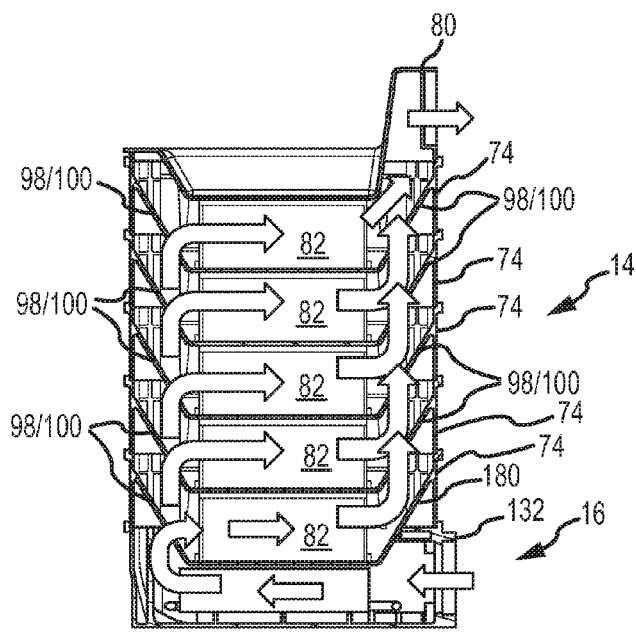
FIG. 11 is a schematic diagram of a desiccant stack, and one configuration for an airflow path through the chamber, referred to herein as a parallel flow path.
Figure 12:
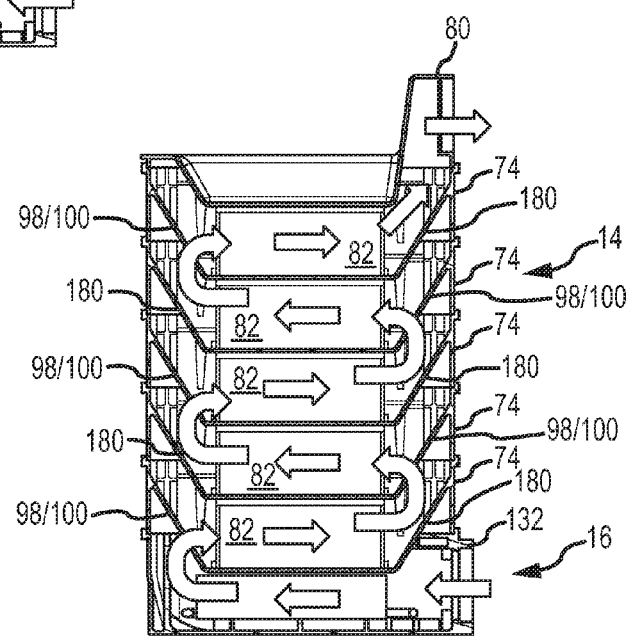
FIG. 12 is another schematic diagram of a desiccant stack, and another configuration for an airflow path through the chamber, referred to herein as a serial flow path.

Referring to FIGS. 11 and 12, in yet another aspect of the invention, it is contemplated that a user may dynamically configure the flow path of air through the device in order to maximize efficiency for the intended use of the device. In the example of FIG. 11, a parallel flow path is illustrated by the directional arrows in which each of the trays 74 have opposing base sidewalls 98 with openings 100, which therefore allows airflow to travel upwards in a vertical manner through the chamber and also horizontally through the media cartridges 82. The only blocked sidewall with no openings 100 is the solid sidewall 180 located above the heat exchanger assembly 16. This sidewall 180 ensures the air initially passes through the heat exchanger for purposes of heating the air, for example, during an extraction cycle. As shown in the FIG. 11 air may travel horizontally through either a first lower media cartridge, or the media cartridge in the second or next higher tray 74.

In the example of FIG. 12, the directional arrows show a torturous or serial flow path that is provided through the chamber of the device. Accordingly, alternating and opposite sidewalls of the stacked desiccant trays 74 include the solid sidewalls 180 without openings 100. One can appreciate the advantages of the dynamic and modular construction of the present invention in which the trays can be placed not only in various combinations of vertical and horizontal arrangements, but also each tray may be configured with either solid sidewalls 180 or sidewalls 98 with openings 100 in order to establish a desired airflow path through the chamber, and thereby maximizing airflow for the intended use of the device.

Referring now to FIGS. 13 and 14, an example construction is provided for a valve or damper and fan combination. As shown, in the schematic diagram of FIG. 1, airflow control through the device includes various pairs of fans and dampers. Accordingly, the FIGS. 13 and 14 are intended to illustrate how these various pairs of fans and dampers may be constructed in accordance with the advantages of the modular construction of the invention. A fan assembly 150 is shown as including a fan housing 158 disposed between a pair of fan flanges 156. The fan 160 is disposed within the fan housing 158, and includes a characteristic fan hub, and a plurality of fan blades. A valve assembly 152 connects to the fan assembly. A single connecting flange 162 may be placed between the valve assembly and fan assembly. The construction of the valve assembly 152 may include two half sections, shown as upper half section 164 and lower half section 166. The flapper or valve element 168 has a mounting pin 170, which is received in the pin openings 174 of the upper half section 164. Pin locks 172 may be used to secure the ends of the mounting pin 170. As also shown in FIG. 13, an adjacent tubing or conduit section 154 may be secured to the fan also by a single connecting flange 162. Similarly, the opposite end of the valve assembly 152 may connect to an adjacent tubing section 154 by a single connecting flange 162. The tubing sections 154 may simply be frictionally received within the adjacent flanges 162. The half sections 164 and 166 may be secured to the flanges 164 also by a friction fit, as achieved by the flange extensions 176, or by some other connecting means in which substantial airflow loss is limited between the connections. As also shown, the fan 150 may be secured to its abutting flanges 162 as by a screw and nut combination. The FIGS. 13 and 14 are intended to illustrate an example construction in which pairs of fans and valves may be connected to one another in line with sections of tubing, wherein the construction is simple, reliable, and repeatable without the need for special tools or equipment. Thus, functionally distinct pairs of fans and valves of the device when installed in the device may be assembled by similar assembly methods.

In order to control the device, an integral controller 84 (FIG. 1) may be used. While manual control is also possible, use of a controller has a number of advantages to include less burdensome user efforts, and more timely and precise control of the device for producing the desired amount of water. The controller 84 may be a known industrial controller, such as a programmable logic controller (PLC).

Referring to the FIG. 15, this figure is intended to represent the controller 84 as a computing device 200 with known functionality. More specifically, FIG. 15 illustrates one embodiment of a computing device 200 comprising hardware elements that may be electrically coupled via a bus 255. The hardware elements may include one or more central processing units (CPUs) 205; one or more input devices 210 (e.g., a mouse, a keyboard, etc.); and one or more output devices 215 (e.g., a display device, a printer, etc.). The computing device 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like. The controller 200 also includes one or more input/output modules 201. The input/output modules may be built in with the controller, or may be one or more external input/output modules that plug into the controller. For PLCs, most of these are equipped with extensive input/output module capabilities in which a wide range of inputs and outputs may be accommodated. Further, because PLCs are typically made for severe operating conditions, the use of a PLC as a controller in the device of the invention may be a preferred option.

The computing device 200 may additionally include a computer-readable storage media reader 225; a communications system 230 (e.g., a modem, a network card (wireless or wired), an infra-red communication device, etc.); and working memory 240, which may include RAM and ROM devices. Optionally, the computing device 200 may include a processing acceleration unit 235, which can include a DSP, a special-purpose processor and/or the like. The computer-readable storage media reader 225 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with a data network and/or with another computing device within a network, as further explained below regarding FIG. 16.

The computing device may also comprise software elements, shown as located within a working memory 240, including an operating system 245 and/or other code 250, such as program code implementing a program or code for operation of the device. The computing device 200 may also employ a GPS receiver 260 for location based capabilities. The GPS receiver 260 can be used to further exploit data regarding geographical and/or weather conditions to improve the operational efficiency of device. For example, the GPS receiver can be used to download data regarding orientation and duration of sunlight and the direction(s) of prevailing winds. This data can be used to update or improve the algorithms to obtain better efficiencies for solar energy extraction and to minimize fan power needs. The computing device 200 may other include a radio transceiver 265 that enables the device to have a wireless communications capability. A particular radio communications protocol may be employed depending upon geographical limitations where the device is installed, enabling the device to maintain wireless communications with a wireless communications network.

Alternate components of the computing device might also be used and/or particular elements might be implemented in hardware, software (including portable software, such as applets), or both. Further, connection to other computing devices such as network input/output devices may be employed.

Although the device has been described with the use of a computing device 200, it is also contemplated that the device may also be controlled by one or more microcontrollers. A microcontroller is an integrated chip including a central processing unit (CPU), a memory element (such as RAM or ROM), a group of input/output ports, and timers. Microcontrollers, however, are typically designed to execute only a limited number of tasks because of the limited processor capabilities and therefore, are limited in terms of their ability to monitor numerous inputs and to generate numerous command outputs. Nonetheless, because of the relatively few inputs and outputs of the device, a microcontroller in combination with a communications element, such as a transceiver with a wireless capability, remains as a viable solution in terms of providing control for the device.

Figure 16:
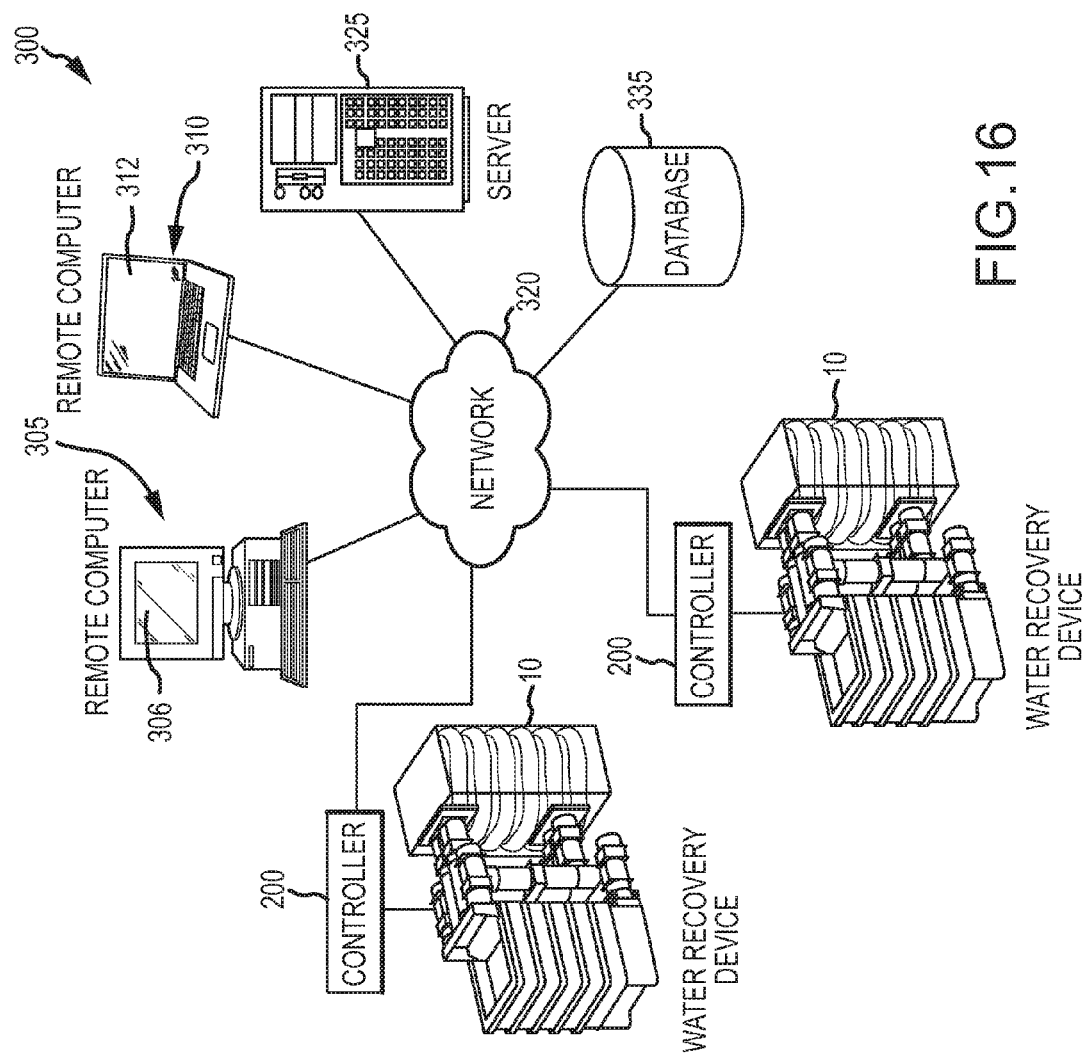
FIG. 16 is a schematic diagram of a communication system, including a plurality of devices with integral controllers operating within a communications network in which one or all of the devices may communicate with other communication nodes of the network, to include download and upload of data and commands.

The computing device or microcontroller(s) may also be incorporated within a communications network, as shown in the FIG. 16. The FIG. 16 is intended to illustrate that either a computing device or microcontroller(s) be represented by the reference numeral 200. Further, the FIG. 16 is intended to illustrate an example communication system 300 that may be used in connection with the device and method disclosed herein. The system 300 may include one or more remote general purpose computers 305 and 310 that communicate through a communications network 310 with one or more of the devices 10, each with their own integral controller/microprocessor(s) 200. By way of example, the general purpose computers may be personal computers and/or laptop computers running various versions of Microsoft Corp.'s Windows™ and/or Apple Corp.'s Macintosh™ operating system(s) and/or workstation computers running any of a variety of commercially-available UNIX™ or UNIX-like operating systems. These remote computers 305 and 310, may also have any of a variety of applications, including for example, database client and/or server applications, and web browser applications. Alternatively, the user computers 305 and 310 may be other electronic devices, such as an Internet-enabled mobile telephone, and/or personal digital assistant, capable of communicating via the network 320 and/or displaying and navigating web pages or other types of electronic documents. Although the exemplary system 300 is shown with two remote computers, any number of remote computers may be supported.

The network 320 may be any type of network familiar to those skilled in the art that can support data communications using any of a variety of commercially-available protocols, including without limitation TCP/IP, SNA, IPX, AppleTalk, and the like. Merely by way of example, the network 320 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system 300 may also include one or more server computers 325. The server 325 may be a web server, which may be used to process requests for web pages or other electronic documents from user computers 305 and 310. The web server can be running an operating system including any of those discussed above, as well as any commercially-available server operating systems. The web server 325 can also run a variety of server applications, including HTTP servers, FTP servers, CGI servers, database servers, Java servers, and the like. In some instances, the web server 325 may publish operations available as one or more web services.

The system 300 may also include a database 335. The database 335 may reside in a variety of locations. By way of example, database 335 may reside on a storage medium local to (and/or resident in) one or more of the computers 305, 310, or on a storage medium local to one or more of the controllers/microprocessor(s) 200 of the devices 10. Alternatively, the database 335 may be remote from any or all of the computers or controllers, and in communication (e.g., via the network 320) with one or all of the computers and controllers. The database 335 may reside in a storage-area network ("SAN") familiar to those skilled in the art. Similarly, any necessary files for performing the functions attributed to the computers and/or controllers/microprocessors may be stored remote from or locally on the respective computers or controllers. The database 335 may be a relational database, such as Oracle 10i™, that is adapted to store, update, and retrieve data in response to SQL-formatted commands.

As also shown in the FIG. 16, the controllers/microprocessor(s) 200 each communicate with other components of the system 300 through the network 320. Although the controllers/microprocessors 200 may have the capability to independently operate and control their corresponding devices 10, additional features of the invention may be available when the controllers are incorporated within the communication system 300. For example, if a device is moved from one location to another, the controller could receive updated algorithms that provide more closely matched programming features corresponding to the particular environment in which the devices may operate. Additionally, software or other command updates may be downloaded to the controllers/microprocessors thereby eliminating the need for manual software updates. Additionally, information may be uploaded from the controllers/microprocessors. This information may be used as historical operating data to improve software programming or other aspects of control for the devices. Since the devices may be operating in remote or austere conditions, the capability for the controllers to communicate through a communications network can provide other benefits. For example, if a controller experiences a malfunction or suffers from a reduced functional capacity, it would be possible to bypass control of the device as normally provided by the controller/microcontroller by commands sent through one or more of the remote computers. In the event there are a multitude of devices functioning simultaneously within one or more locations, the computing capability of the server 325 may be advantageous in providing additional or supplemental control to the devices. Additionally, the database 335 can be useful in compiling operational data for the devices in order to improve the sets of algorithms and software commands that may be associated with operation of the devices. Those skilled in the art can appreciate other advantages of incorporating a device 10 within a communication system 300.

Figure 17:
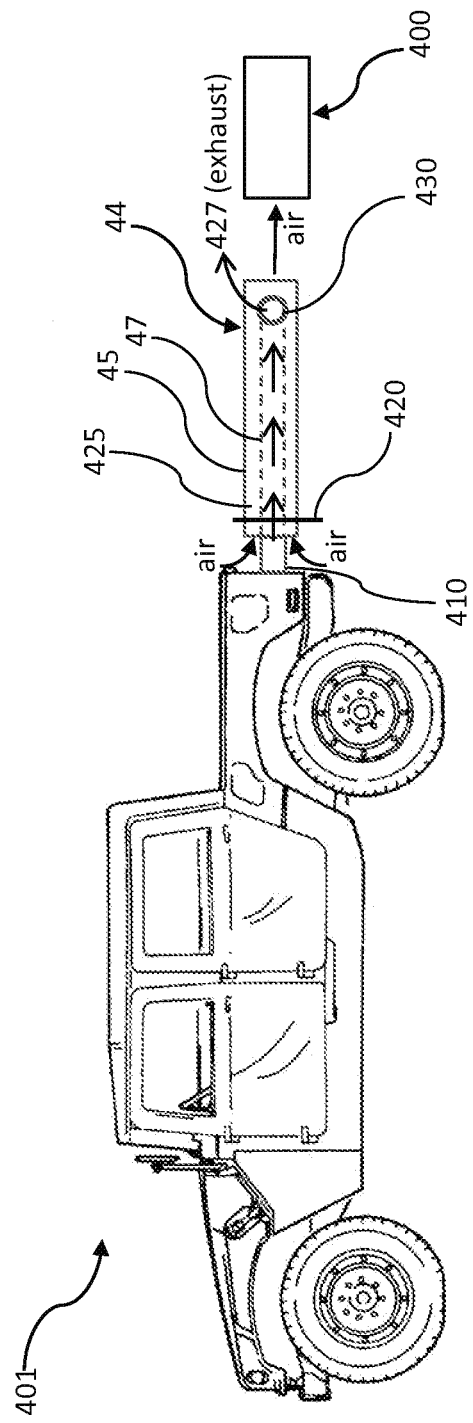
FIG. 17 is a schematic diagram of the device configured for use with a vehicle waste heat source.

FIG. 17 is a schematic diagram of the device configured for use with a vehicle waste heat source. Specifically, waste heat generated by the exhaust 427 of a vehicle 401 is captured upon exit from the vehicle's exhaust pipe 410 and fitted to the heating line 44 of the device 400. In this manner, waste heat emitted by the exhaust 427 from the exhaust pipe 410 of an engine is utilized as a heat source. In the embodiment of FIG. 17, a heating line 44 is configured to engage the exhaust pipe 410 of the vehicle 401 by fitting over the exhaust pipe 410. The line 44 has an outer flexible tube 45 and an inner flexible line 47 that is secured and sealed by a sealing mechanism 420, such as a hose clamp. At a downstream position, a vent 430 is provided to vent the exhaust 427 into the atmosphere. In this configuration, ambient air 425 between the heating line 44 and the exhaust pipe 410 is heated by the hot exhaust 427 of the vehicle engine; the heated air is then input to the heat exchanger assembly 16 (not shown) of the device 400 or directly into the manifolds 132.

Figure 18:
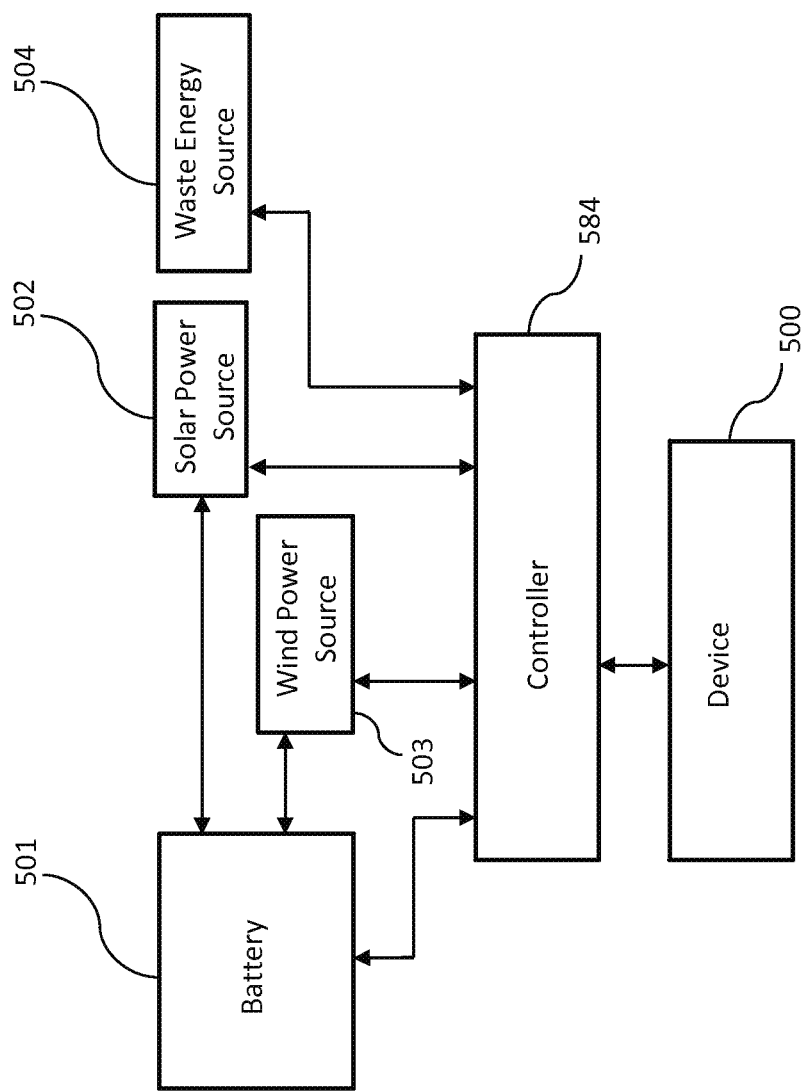
FIG. 18 is a block diagram of the device configured for use with a multiple set of power sources.

FIG. 18 is a block diagram of the device 500 configured for use with a multiple set of power sources. Specifically, device 500 is shown engaged, via controller 584, with four power sources: a battery 501, a wind power source 503, a solar power source 502, and a waste energy source 504. The controller 584 selectively monitors and controls power input to the device 500 from the four power sources 501, 502, 503, 504. Power sources may also communicate with one another. For example, in the embodiment shown, each of wind power source 503 and solar power source 502 communicate with battery 501. Such communication from the power source 502, 503 to the battery 501 may serve, for example, to charge the battery 501. Also, the communication may be from the battery to the power source 502, 503 to provide, for example, start-up power to power source 502, 503. In one embodiment, the controller 584 is configured in a manual mode. In manual mode, the controller 584 may receive an input from a user to exclusively draw from battery power 501, or, if a source of waste energy was available that could produce power, to draw from the waste energy source 504. In another embodiment, the controller 584 is configured in an automatic mode. In automatic mode, the controller 584 may be configured, for example, to draw from battery power 501 during nighttime hours and from solar power 502 during daylight hours. The controller 584 could also be configured, for example, in an automatic mode to draw from one or more power sources using more sophisticated algorithms. For example, in a daytime scenario with limited wind, the controller 584 may be configured to direct the wind power source 503 to charge battery 501 while drawing power from the solar power source 502 to drive the device 500. Additional configurations and algorithms for automatic control of the device 500 by controller 584 are conceivable by those skilled in the art.

In one example use scenario of the device 500 configured for use with multiple power sources, the device 500 is deployed to a remote location devoid of power sources. Once a location for the device 500 is selected, the device is configured to initially run from battery source 501. Should wind conditions develop sufficiently to provide power via wind power source 503, the controller 584 begins to draw power from wind source 584 to complement that draw from battery 501. Should the power from wind power source 584 become sufficient to power device 500 without the need for supplemental power from battery 501, the controller stops drawing any power from battery 501 and draws exclusively from wind power source 503.

In accordance with methods of the present invention, a device removes water vapor from an incoming, ambient airstream. The exhaust airstream leaving the device is therefore a dried or water lean airstream. Operation of the device can conceptually be divided into two main cycles, namely, a charge cycle and an extraction cycle. In the charge cycle, the ambient airstream is passed through a chamber, across a desiccant stack, and back to the environment. The desiccant absorbs water vapor in the air stream. The desiccant is preferably employed in a liquid solution with water. The desiccant solution is distributed in the chamber by a desiccant media, including a plurality of media sheets, preferably in folded media sheets configured within media cartridges disposed in each tray of the desiccant stack.

In accordance with the methods, a charge cycle includes absorption of water vapor, and controlling the amount of water vapor removed from the airstream such that the desiccant solution does not become over saturated with water. In arid climates, it may be advantageous to run the charge cycle during nighttime hours when the relative humidity rises due to a corresponding drop in ambient air temperature. A controlled flow of air is passed through the chamber of the device by one or more fans. As set forth above in the illustrated preferred embodiment, one or more fans may be located at the entrance to the chamber, coupled with one or more fans located at the exit of the chamber. Airflow sensors along with temperature and humidity sensors monitor the state of the chamber. An optimum airflow through the chamber is achieved to match the desired quantity of water to be recovered. If a relatively small amount of water is the recovery requirement, then a smaller volume of air is passed through the chamber as compared to a larger water recovery requirement that must be attained in the same amount of operation time. Once the desiccant media has absorbed the requisite amount of water for the charge cycle, an extraction cycle is commenced. First, the chamber is isolated from the ambient airstream by closing all valves or dampers that communicate with the surrounding environment. Heat energy is added to the chamber. This may be achieved by use of a heat exchanger that has many possible sources of power. Heat energy is added to a predetermined point in which vaporization occurs for the water within the chamber. At this point, the moist air within the chamber can be circulated through a condenser. Preferably, the condenser does not require a separate source of power for cooling. Rather, it is preferred to initiate condensing when the internal temperature within the chamber exceeds a dew point temperature relative to the external ambient temperature. Accordingly, the cooling "source" for the condenser is simply the ambient air, and a flow of ambient air is passed through the condenser to achieve condensing of the moist chamber air. The condenser has a passageway, typically defined by a cooling coil, in which the cooler temperature of the coil causes the water vapor to condense. Water droplets condensed on the surfaces of the condensing coil are collected in a container that communicates with the condensing coil. During this condensing phase of the extraction cycle, heat continues to be added to the chamber for a period of time to evaporate a desired amount of water trapped within the chamber. Accordingly, recirculation of the air within the chamber occurs in which a return line is provided from the condenser back to the chamber. In addition to adding heat to the chamber, the vaporization temperature of the water can be more easily achieved by reducing the pressure within the chamber. For example, a partial vacuum can be drawn for the air within the chamber, and the remaining amount of air within the chamber can be heated and re-circulated during the condensing phase.

Further in accordance with methods of the invention, it is contemplated that optimal desiccant solution ratios are maintained for each reservoir of solution within each tray. Liquid level sensors along with chemical concentration sensors may be employed in each tray to monitor liquid levels and desiccant concentrations. As needed, desiccant solution can be replaced and/or water may be automatically added to each tray as supplied from supply reservoirs that communicate with each of the trays.

Further in accordance with methods of the invention, the dried airstream that is produced during a charge cycle can be used to condition the interior airspace of a man-made structure. Accordingly, duct work may be connected to the exhaust airstream interconnecting the exhaust airstream with the interior airspace.

Also in accordance with methods of the invention, the modular construction of the device allows for easily changing the water recovery capacity of the device. Therefore, it is contemplated that water recovery capability can be optimized by changing the number of trays used by changing the exposed surface area of the media cartridges, and/or changing the flow path of air through the chamber. As discussed, a serial flow path through the chamber or a parallel flow path through the chamber changes the dwell time of the airstream within the chamber. These different flow paths also result in greater or lesser contact of the desiccant media with the airstream which, in turn, alters the rate at which water is absorbed by the desiccant. Additionally, the flow rate of air through the chamber of the device can also be adjusted to meet the desired water recovery requirement. In general, a greater flow rate of air through the chamber should result in a greater amount of water recovered as compared to a lesser flow rate.

Also in accordance with methods of the invention, it is contemplated that dynamic programming is used with a controller/microprocessor to optimize device operation. Within the controller/microprocessor programming, algorithms can be used that establish base line or initial operation parameters based upon known environmental factors. These environmental factors include daily temperature data, daylight data, humidity data, wind data, and potential damage scenario data. Each of these factors may ultimately affect the operation of the device. With respect to temperature and humidity data, this data will partially determine optimum times for operating the cycles of the device. The daylight data also helps to define when temperature and humidity changes will most rapidly occur during average temperature conditions. Wind data can be used to ensure the device is oriented in the proper direction such that a constant flow of air can be provided through the device without undue affects of adverse wind conditions. Potential damage scenarios relate to the specific location where the device is placed, and the chances that a human or environmental event will damage or destroy the device. By evaluating each of these factors as compared to different geographical locations, initial setup and operation of a device is simplified and initially optimized. As a particular device is placed into operation, continued monitoring of environmental conditions along with the operational capability of the device can be used to alter the initial operational algorithms to then establish optimal operational parameters. Because multiple devices may be employed in austere or difficult to travel locations, it is also advantageous to incorporate the devices within a communications network in which operation of the devices may also be controlled remotely. For example, consider a device that has been damaged, or has one or more components that are not functioning to capacity. In this scenario, commands may be issued from a remote computing device to change the current operational algorithms to compensate for the damage to components. One specific example could relate to a component such as a fan or valve that has limited functioning, and therefore, the operational algorithm could be modified to change the operation of these elements in order to meet the desired water recovery goal.

Also in accordance with methods of the present invention, it may be possible to determine the optimum times for running a charge cycle simply by evaluating nighttime hours. For example, light sensors and a time of day clock may be used by the controller to initiate and terminate a charge cycle, the conclusion in this method of control being that nighttime hours are the best for running the charge cycle.

Further in accordance with methods of the invention, it is contemplated that the recovered water may be further treated to ensure it is potable. For example, a number of additional water treatment measures may be taken to make the water potable. Such measures may include filtration, exposure to ultraviolet light, mineralization, chlorination, and/or further chemical treatment.

Further in accordance with methods of the invention, it is contemplated that in lieu of a single heat exchanger, a desiccant stack may take advantage of multiple heat exchanging assemblies powered by a single source of power. Accordingly, selected trays within a desiccant stack may be disposed between one or more heat exchanging assemblies in which each assembly has a heating line, a heat distribution element, and sensors. These assemblies may each have their own housing, or the trays may be modified to incorporate the heat exchanging assemblies in which a single housing can be used for both a desiccant tray and heat exchanging assembly combination.

While illustrative embodiments have been described in detail herein, it is to be understood that the concepts may be otherwise variously embodied and employed, and that the appended claims are intended to be construed to include such variations, except as limited by the prior art.

What is claimed is:

1. A water recovery device comprising:
a desiccant stack including a chamber defining an airflow path therein, the desiccant stack including a plurality of desiccant trays, each desiccant tray including a desiccant media cartridge and an amount of liquid desiccant placed within the desiccant tray and absorbed by a media material of the media cartridge;
a condenser communicating with the desiccant stack;
a heat exchanger communicating with the desiccant stack;
a heat source in communication with the heat exchanger for providing heat to the heat exchanger;
wherein the water recovery device is operated in a charge cycle for circulating ambient air through the chamber to remove water vapor by the liquid desiccant and retaining water vapor in the chamber, the water recovery device being further operated in an extraction cycle to remove the retained water vapor within the chamber, the condenser providing a cooling source to condense the water vapor, thereby producing an amount of water condensate.

2. A water recovery device, as claimed in claim 1, wherein:
the heat source comprises a heating fluid, a heating fluid tank and a heating line, the heating line in fluid communication with the heat exchanger.

3. A water recovery device, as claimed in claim 2, wherein:
the heat source includes at least one of a solar collector, a photovoltaic cell, an electric heater, a gas heater, a diesel heater, a steam generator, a boiler, a hot process stream, a geothermal source, a manual source and heat collected from a waste heat source.

4. A water recovery device, as claimed in claim 3, further comprising:
a controller incorporated in the device for controlling functioning of the device to include the charge cycle and the extraction cycle, the device further including a plurality of sensors as inputs to the controller, and a plurality of valves and fans as outputs of the controller, the valves and fans being located within air transport lines of the device.

5. A water recovery device, as claimed in claim 4 wherein:
the plurality of sensors includes temperature sensors and humidity sensors.

6. A water recovery device, as claimed in claim 5, wherein:
the heat exchanger is placed below the desiccant stack, and an airstream flowing through the device first flows through the heat exchanger and then through the chamber.

7. A water recovery device, as claimed in claim 1, wherein:
the heat source comprises a heating fluid and a heating line, the heating line in fluid communication with the heat exchanger.

8. A water recovery device, as claimed in claim 7, wherein:
the heat source includes at least one of a solar collector, a photovoltaic cell, an electric heater, a gas heater, a diesel heater, a steam generator, a boiler, a hot process stream, a geothermal source, a manual source and heat collected from a waste heat source.

9. A water recovery device, as claimed in claim 8, further comprising:
a controller incorporated in the device for controlling functioning of the device to include the charge cycle and the extraction cycle, the device further including a plurality of sensors as inputs to the controller, and a plurality of valves and fans as outputs of the controller, the valves and fans being located within air transport lines of the device.

10. A water recovery device, as claimed in claim 9, further comprising:
a power source, the power source in communication with the heat source, the power source providing power to the heat source.

11. A water recovery device, as claimed in claim 10, wherein:
the power source includes at least one of a diesel engine, a boiler, a battery, a geothermal source, a hydroelectric source, a human-powered source, and power over Ethernet.

12. A water recovery device, as claimed in claim 11, further comprising:
a controller incorporated in the device for controlling functioning of the device to include the charge cycle and the extraction cycle, the device further including a plurality of sensors as inputs to the controller, and a plurality of valves and fans as outputs of the controller, the valves and fans being located within air transport lines of the device; and
the heat source comprises a heating fluid, a heating fluid tank and a heating line, the heating line in fluid communication with the heat exchanger.

13. A water recovery device, as claimed in claim 12, wherein:
the power source also supplies power to at least one additional element of the device other than the heat source.

14. A water recovery device, as claimed in claim 13, wherein:
the heat exchanger is placed below the desiccant stack, and an airstream flowing through the device first flows through the heat exchanger and then through the chamber.

15. A water recovery device, as claimed in claim 14, wherein:
the controller comprises a programmable logic controller and a microcontroller.

16. A water recovery system, comprising:
(a) water recovery device including:
(1) a desiccant stack including a chamber defining an airflow path therein, the desiccant stack including a plurality of desiccant trays, each desiccant tray including a desiccant media cartridge and an amount of liquid desiccant placed within the desiccant tray and being absorbed by a media material of the media cartridge;
(2) a condenser communicating with the desiccant stack;
(3) a heat exchanger communicating with the desiccant stack;
(4) a heat source in communication with the heat exchanger for providing heat to the heat exchanger;
wherein the water recovery device is operated in a charge cycle for circulating ambient air through the chamber to remove water vapor by the liquid desiccant and retaining water vapor in the chamber, the water recovery device being further operated in an extraction cycle to remove the retained water vapor within the chamber, the condenser providing a cooling source to condense the water vapor, thereby producing an amount of water condensate;
(b) a controller incorporated in the water recovery device for controlling functioning of the water recovery device to include the charge cycle and the extraction cycle, the water recovery device further including a plurality of sensors as inputs to the controller, and a plurality of valves and fans as outputs of the controller, the valves and fans being located within air transport lines of the water recovery device; and
(c) a communications node incorporated within a communications system enabling the water recovery device to communicate within the communications system.

17. A water recovery device, as claimed in claim 16, wherein:
the heat source comprises a heating fluid and a heating line, the heating line in fluid communication with the heat exchange.

18. A water recovery device, as claimed in claim 17, wherein:
the heat source includes at least one of a solar collector, a photovoltaic cell, an electric heater, a gas heater, a diesel heater, a steam generator, a boiler, a hot process stream, a geothermal source, a manual source and heat collected from a waste heat source.

19. A water recovery device, as claimed in claim 1, further comprising:

a power source, the power source in communication with the heat source, the power source providing power to the heat source.

20. A water recovery device, as claimed in claim 19, wherein:

the power source includes at least one of a diesel engine, a boiler, a battery, a geothermal source, a hydroelectric source, a human-powered source, and power over Ethernet.

* * * * *